US012354335B1

(12) United States Patent
Lillywhite et al.

(10) Patent No.: US 12,354,335 B1
(45) Date of Patent: Jul. 8, 2025

(54) GENERATION OF NON-PRIMARY-CLASS SAMPLES FROM PRIMARY-CLASS-ONLY DATASET

(71) Applicant: Smart Vision Works, Inc., Orem, UT (US)

(72) Inventors: Kirt Dwayne Lillywhite, Provo, UT (US); Curtis Martin Koelling, Springville, UT (US); Craig William Call, Orem, UT (US); Matthew Ryan Heydorn, Provo, UT (US)

( * ) Notice: Subject to any disclaimer, the term of this patent is extended or adjusted under 35 U.S.C. 154(b) by 434 days.

(21) Appl. No.: 17/705,187

(22) Filed: Mar. 25, 2022

Related U.S. Application Data

(60) Provisional application No. 63/166,218, filed on Mar. 25, 2021.

(51) Int. Cl.
*G06V 10/774* (2022.01)
*G06T 11/00* (2006.01)

(52) U.S. Cl.
CPC ........ *G06V 10/7747* (2022.01); *G06T 11/001* (2013.01)

(58) Field of Classification Search
USPC .......................................... 382/159
See application file for complete search history.

(56) References Cited

U.S. PATENT DOCUMENTS

| | | | | |
|---|---|---|---|---|
| 2012/0249741 A1* | 10/2012 | Maciocci | ............. | G06T 19/006 |
| | | | | 348/51 |
| 2020/0027271 A1* | 1/2020 | Guay | .................... | G06T 19/006 |
| 2020/0151692 A1* | 5/2020 | Gao | .................... | G07G 1/0063 |
| 2021/0117718 A1* | 4/2021 | Badjatiya | ............. | G06F 18/214 |
| 2021/0133511 A1* | 5/2021 | Bian | ....................... | G06F 16/51 |
| 2021/0241510 A1* | 8/2021 | Kuribayashi | ........... | G06T 15/04 |

* cited by examiner

*Primary Examiner* — Jacky X Zheng
(74) *Attorney, Agent, or Firm* — Shapiro IP Law; Joseph Shapiro

(57) ABSTRACT

An ASDGS (Artificially Spiked Data Generation System) may comprise computing and mechanical systems for using a single class of data to generate artificially "spiked" data of a second class. To generate each spiked image, the ASDGS may randomly select a clean image an augmentation object ("AO") from an object library, shape library, and/or hair library. The ASDGS may use a texture library to add or change the texture of the AO. The ASDGS may adjust the lighting and coloring of the AO to be similar to the clean image, and may then add the AO to the clean image to generate a spiked image.

13 Claims, 15 Drawing Sheets

GENERATION OF NON-PRIMARY-CLASS SAMPLES FROM PRIMARY-CLASS-ONLY DATASET

BACKGROUND OF THE INVENTION

Machine learning and artificial intelligence systems are frequently used to automate image classification systems. In one exemplary use, a conveyance system such as a conveyor belt may move objects past the field of view of a camera, which may capture an image of the conveyance system and object(s) and then use image processing and machine learning techniques to classify the captured image and make a decision based on the classification. For example, a potato processing system may move potatoes on a conveyor belt. An overhead camera may capture an image of the potatoes on the conveyor belt and may input the image to a 2-class classification model which may output a classification of no-foreign-material or has-foreign material. Based on a classification of has-foreign-material, the control system may take action to remove the foreign material or to alert a human to intervene for removal of the foreign material.

One such problem domain may be detection of foreign material objects in images from mono-substance processing stream. "Mono-substance" means that only one substance is being processed and any other item, object, or material is undesirable foreign material. A "substance" may be, e.g., meat slabs, broccoli, potatoes, shrimp, or any other substance. In general, this approach is applicable to substances comprising discrete objects. Although the disclosure herein focuses primarily on discrete objects or a processing stream comprising discrete objects, the invention and algorithm described herein applies similarly to processing streams comprising collective substances, e.g., sugar, flour, salt, a liquid, etc.

As used herein below, "class A" refers to the desirable substance and "class B" refers to the undesirable substance, which may also be referred to as "foreign material" or "FM." Although the disclosure herein uses an example of identifying a foreign material among a desirable substance (i.e., no-foreign-material or has-foreign-material), the disclosure herein may be more abstractly applied to the general two-class classification problem.

Such classification systems can be quite effective. One drawback, however, is that using a machine learning system to train a classification model requires pre-classified training images from both classes, but frequently images from only one class are sufficiently available.

For example, training a machine-learning system to differentiate between an image including only potatoes on a conveyance surface and an image containing potatoes and a foreign material (e.g., a rock) on a conveyance surface may require a training set comprising at least two datasets: one dataset containing images having potatoes without any foreign material and another dataset containing images having potatoes and foreign material. Cross-contamination of the images, e.g., an image incorrectly classified as no-foreign material but that does contain foreign material would detract from the system's ability to learn to distinguish the no-foreign material class from the has-foreign-material class.

But samples from both classes are not always readily available, or there may be a high cost to obtain samples from one of the classes. Often samples are available for only one of the two classes. Under these circumstances, some have proposed using a confidence rating system to determine how "confident" the labeler is that an image or sub-image belongs in a certain class. But this still requires hand-labeling of the dataset.

Another proposal is to generate samples for an unavailable (or under-available) class of images by using a program such as Adobe® Photoshop® or GIMP (GNU Image Manipulation Program) to manually generate samples for the unavailable (or under-available) class. But this approach may be time consuming and labor-intensive, and may not produce enough images of the desired class to adequately train a machine learning system and generate a sufficiently useful classification model. Additionally, such images may be ineffective for training because they are not "natural" and will not effectively train the model.

In many two-class classification problems, a significant number of samples of class A (e.g., "clean," or "no-foreign-material") may be readily available but samples of class B (e.g., "dirty" or "FM" or "has-foreign-material") may be limited, scarce or non-existent. This can be problematic because training a model to correctly classify class A and class B usually requires a significant number of pre-classified training samples from both class A and class B. What is needed is a method for artificial/computerized generation of samples of class B based on samples of class A.

BRIEF SUMMARY OF THE INVENTION

An ASDGS (Artificially Spiked Data Generation System) may comprise computing and mechanical systems for using a single class of data to generate artificially "spiked" data of a second class. The generated artificially spiked dataset may be then used, along with data from the first class, as inputs to a machine learning system to train a classification model. The classification may then be used to classify captured images from food processing systems or from other domains.

Input to the ASDGS may comprise a dataset of clean (no-foreign-material) images, an object library comprising segmented images of real-world objects, a shape library comprising computer-generated shapes, a texture library comprising real-world and/or computer-generated shapes, and a hair library. To generate a spiked image, the ASDGS may randomly select an image ("Background Image") from the clean dataset and an object, shape, or hair ("Augmentation Object") from the object library, shape library, and/or hair library. A randomly selected texture from the texture library may be applied to a selected shape or object.

The ASDGS may calibrate the Augmentation Object to increase similarity with the Background Image by adding/removing noise, adding/removing blurring, color matching, and lighting matching. The ASDGS may also apply random rotation and/or flipping to the Augmentation Object.

The ASDGS may add the calibrated Augmentation Object to the Background Image by selecting a location in the Background Image, resizing the calibrated Augmentation Object, applying transparency to the Augmentation Object, applying edge blending to the Augmentation Object and/or Background Image, and/or cropping the Augmentation Image.

In this manner, the ASDGS may generate a large set of spiked images, which may be referred to as a spiked image dataset. The spiked image dataset and a clean dataset may be input to a machine learning system for training a classification model. The trained classification model may then be used to classify captured images from a processing stream, e.g., potatoes on a conveyance system. Based upon a classification of has-foreign-material, a mechanical system may be activated to sort, redirect, remove, and/or otherwise handle the foreign material.

DETAILED DESCRIPTION OF THE INVENTION

Figure 1A:
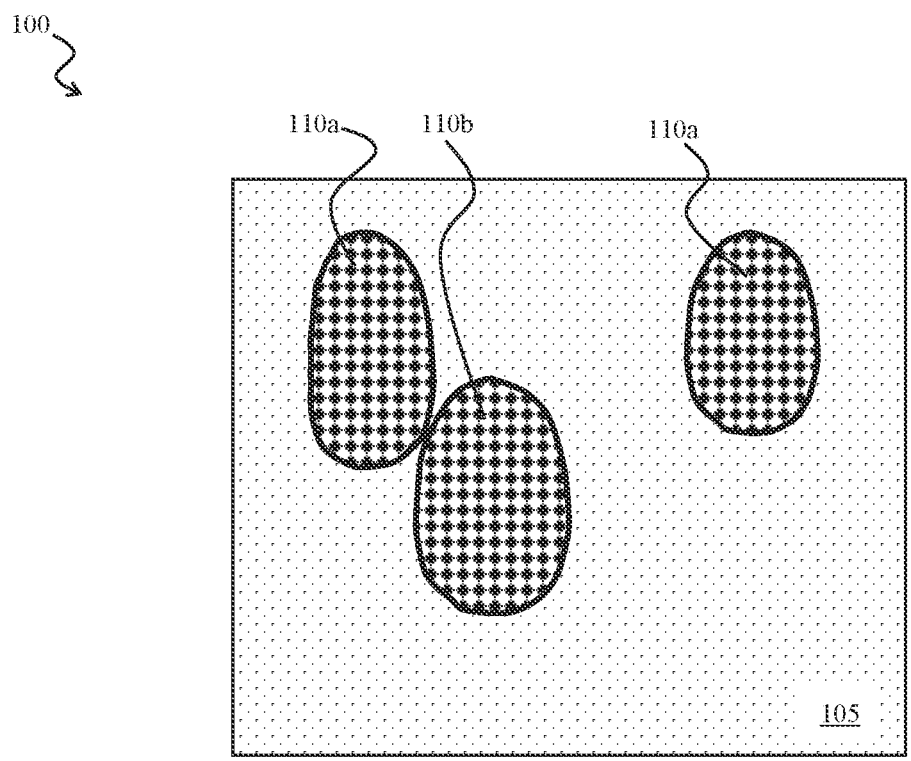
FIG. 1A shows an exemplary no-foreign-material image.

This Application claims priority to U.S. Provisional Application No. 63/166,218, titled "AUTOMATIC IMAGE INTERPOLATION OF DISPARATE IMAGE SOURCES WITH STOCHASTICALLY AUGMENTED IMAGE MANIPULATION ALGORITHMS FOR MACHINE LEARNING CLASSIFICATION VIA A SINGLE-CLASS DATASET SOURCE FOR MULTI-CLASS IDENTIFICATION, RECOGNITION, AND CLASSIFICATION," and filed on Mar. 25, 2021, and which is incorporated herein by reference in its entirety.

A system and method are disclosed for using a one-class dataset to generate a multi-class training dataset for machine learning.

TABLE OF REFERENCE NUMBERS FROM DRAWINGS

The following table is for convenience only and should not be construed to supersede any potentially inconsistent disclosure herein.

| Reference Number | Description |
| --- | --- |
| 100 | Image capture of processing stream only potatoes (no foreign material) |
| 105 | Conveyance surface |
| 110a-n | potatoes |
| 150 | Image capture of processing stream with potatoes and foreign material |
| 170 | Foreign material |

-continued

| Reference Number | Description |
| --- | --- |
| 200 | Dataset comprising captured clean images |
| 210a-d | Clean image from dataset of clean images |
| 300 | Foreign material object library |
| 310a-d | Foreign material object from foreign material object library |
| 400 | Shape library |
| 410a-d | Shape from shape library |
| 500 | Texture library |
| 510a-d | Texture from texture library |
| 600 | Hair library |
| 610a-d | Hair from hair library |
| 700 | Background Image |
| 710a-b | Potatoes in Background Image |
| 810 | Randomly selected object (310a) prior to performing any calibration operations |
| 820 | Selected object after performing a random rotation |
| 830 | Selected object after performing a flip |
| 840 | Selected object after resizing |
| 850 | Selected object after cropping |
| 910 | Selected shape (410d) prior to adding texture or performing any calibration operations |
| 920 | Randomly selected texture (510a) |
| 930 | Selected shape with randomly selected (510a) texture applied |
| 940 | Random rotation applied to shape |
| 950 | Flip applied to shape |
| 960 | Resized shape |
| 1010 | Randomly selected hair (610c) |
| 1020 | Hair with random rotation applied |
| 1030 | hair after flip applied |
| 1110 | Background anchor |
| 1120 | Object anchor |
| 1210 | Background anchor |
| 1220 | Object anchor |
| 1310 | Background anchor |
| 1320 | Object anchor |
| 1400 | Flowchart |
| 1410 | Process step |
| 1420 | Process step |
| 1430 | Process step |
| 1440 | Process step |
| 1500 | Flowchart |
| 1505 | Process step |
| 1510 | Process step |
| 1515 | Process step |
| 1520 | Process step |
| 1525 | Process step |
| 1530 | Process step |
| 1535 | Process step |
| 1540 | Process step |
| 1545 | Process step |
| 1550 | Process step |
| 1555 | Process step |
| 1560 | Process step |
| 1565 | Process step |
| 1570 | Process step |
| 1575 | Process step |
| 1580 | Process step |

Figure 1B:
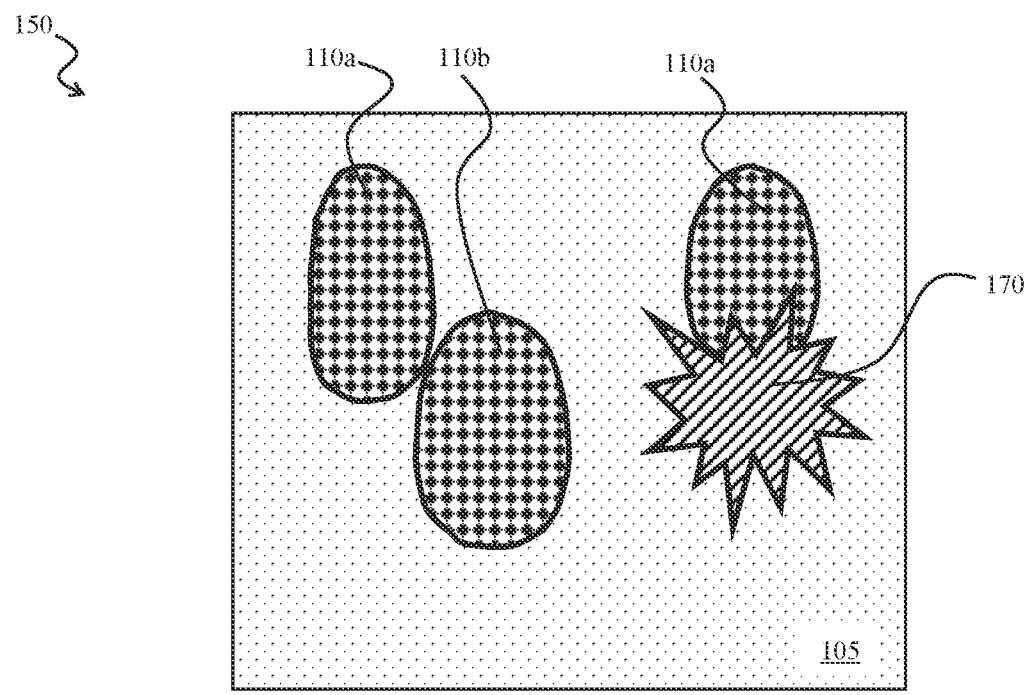
FIG. 1B shows an exemplary has-foreign-material image.

In one problem domain, samples are images taken of a processing stream. Often this is a conveyor belt or other conveyance system. A sample classified as class A does not have any foreign material in it. "Foreign material" may be defined differently according to problem domain. In one problem domain, foreign material may be everything except a desired item, e.g., potatoes. The disclosure herein below is based on a processing stream moving potatoes along a conveyance system. Foreign material may be anything other than potatoes or the surface of the conveyance system. For example, foreign material may be hair, rocks, plastic, wrappers, sticks, etc. In this example, an image of class A (no-foreign-material) has only potatoes on the conveyance surface, but an image of class B (has-foreign-material) includes at least one instance of foreign material—in addition to the conveyance surface and possibly/likely potatoes. FIG. 1A shows an exemplary image 100 of class A (no-foreign-material) showing potatoes 120a-c on conveyance surface 105. FIG. 1B shows an exemplary image sample of class B (has-foreign-material) showing potatoes 110a-c and foreign material 170 on conveyance surface 105.

An Artificially Spiked Dataset Generation System ("ASDGS") may be used to generate an artificially spiked dataset, i.e., a dataset comprising class B (has-foreign-material) images, each of which includes at least one instance of foreign material.

Although the disclosure herein focuses on using a dataset of a first class to generate a dataset of a second class, the disclosure herein could be similarly applied to any problem domain requiring generation of one missing (or underrepresented) class based on known-classified samples from one or more other classes.

Inputs to the ASDGS may include (i) a dataset of class A (no-foreign-material) samples, (ii) a foreign material object library, (ii) a texture library, (iv) a shape library, and (v) a hair library.

For the sake of clarity, as used herein "random" refers to a selection process based on a probability density function. Although "random" may refer to the uniform probability density function, "random" may also reference or be used in conjunction with any other probability density function. Where a specific probability density function or set of probability density functions is not specified, use of "random" does not otherwise refer to or limit to a specific probability density function or set of probability density functions.

Class a (No-Foreign-Material) Images Dataset

The dataset of class A (no-foreign-material) samples may be a set of captured images of the processing stream, e.g., images from an overhead camera of a conveyor belt and objects/substances on the conveyor belt. These images are known class A (no-foreign-material), i.e., they are clean and have no instances of foreign material. These images may have been hand-classified or otherwise verified as being clean. In one embodiment, the dataset of class A (no-foreign-material) samples may comprise 10,000 images. For example, if the problem domain is processing potatoes and identifying foreign material in a processing stream of potatoes, then the class A (no-foreign-material) dataset images may be images from the actual potato processing stream showing potatoes on the conveyance surface.

The system and method described herein may be applicable for different conveyance surfaces or systems (or, more generally, backgrounds). For example, the background may be a substantially flat surface comprising a conveyance system. In practice, the conveyance system may be designed to be a color/pattern that is distinct from the class A (no-foreign-material) substance and the anticipated visual characteristics of the class B (has-foreign-material) substance. For example, a conveyance system background surface may be a monolithic solid-color (e.g., bright blue, or white) belt, or a connected set of solid-color panels (e.g., bright blue, or white). Although it is easier for the machine learning system described herein to train a classification model when the background color, pattern, topography, and texture are uniform, easily identifiable, and/or distinct from the color, pattern, topography, and/or texture of instances of the class A substance and instances of the class B substance, the system and method described will notwithstanding still be able to train an accurate classification model if these uniformity and distinctness conditions are not present—but performance may be diminished or more effort or input images may be necessary to train the classification model. In some embodiments, the input training set (as described below) may include many different background variations, e.g., clean, dirty, etc.

Figure 2:
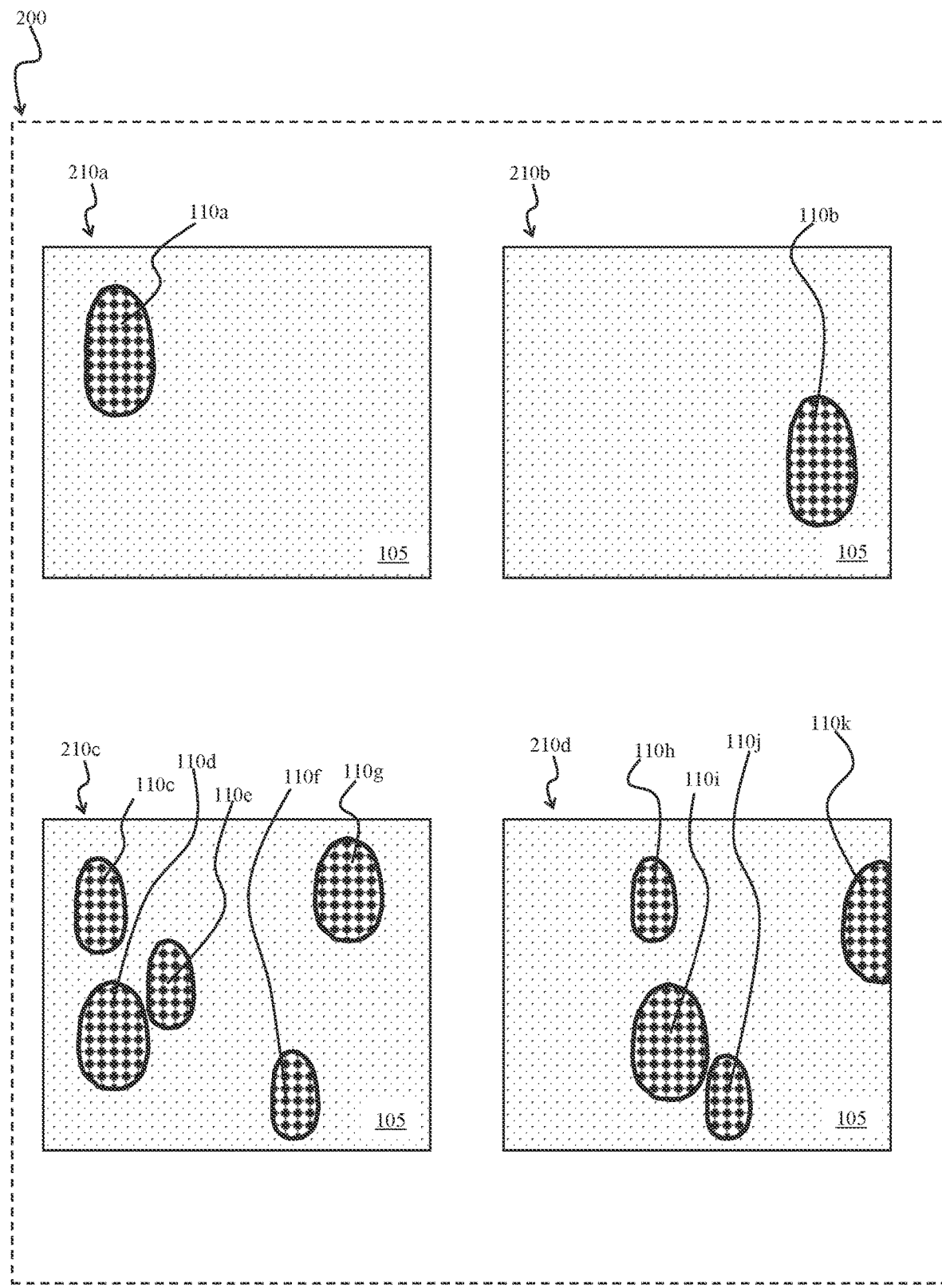
FIG. 2 shows an exemplary dataset of no-foreign-material images.

FIG. 2 shows an exemplary dataset 200 of no-foreign-material images 210a-d. More specifically, FIG. 2 shows image captures 210a-d of potatoes 110a-n on conveyance surface 105.

Foreign Material Object Library

The foreign material object library may comprise a set of foreign material objects, which in one embodiment may be defined by images of segmented foreign material objects. The objects may be segmented in many ways. In one embodiment, object segmentation may comprise a set of points defining the perimeter of the object with the image. Many such object libraries are available on the Internet or from other sources. A foreign material object library may also include known examples of foreign materials for a particular problem domain. In some embodiments, the foreign material object library may be checked to ensure that it does not include any images of the desirable substance.

Figure 3:
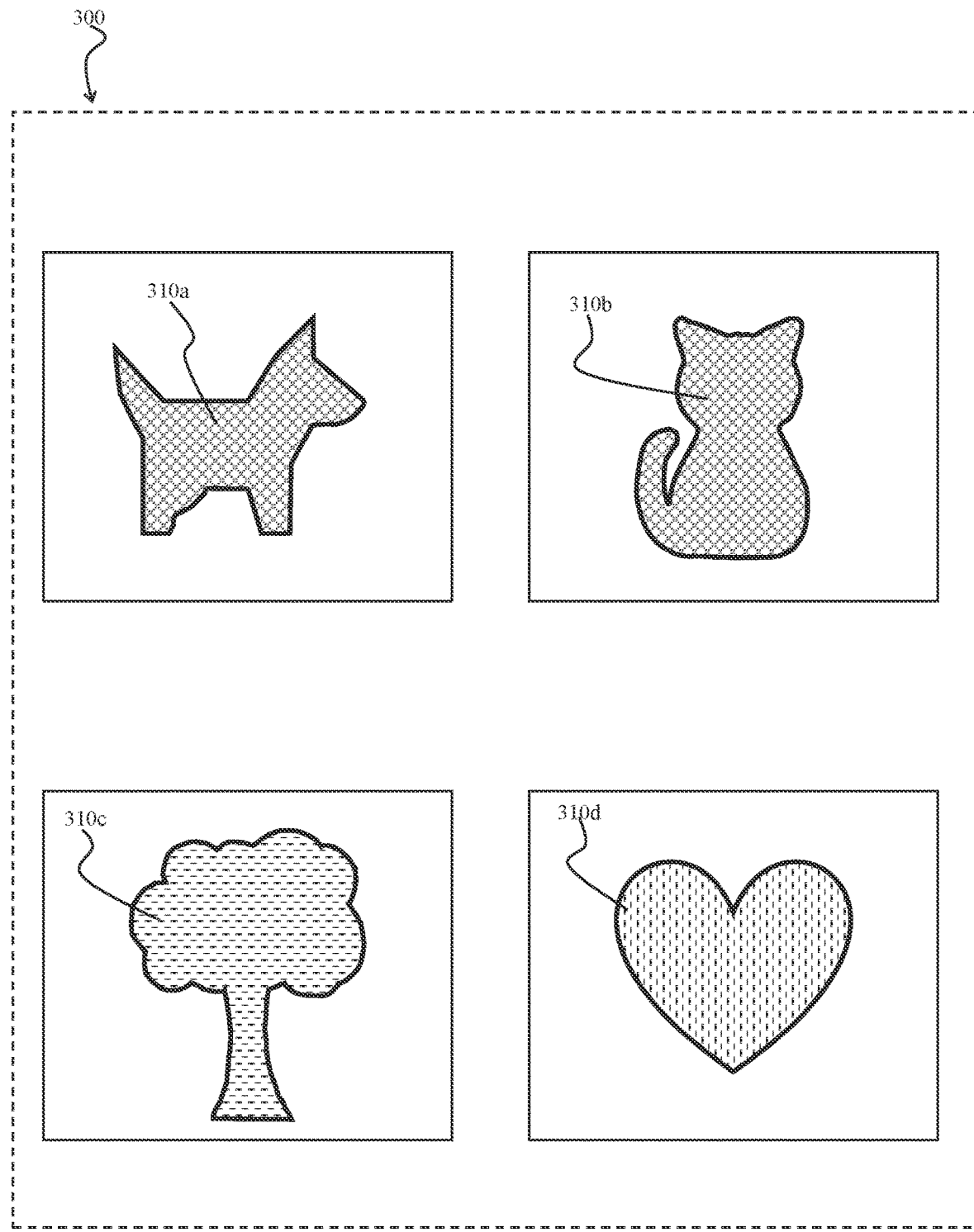
FIG. 3 shows an exemplary foreign material object library.

FIG. 3 shows an exemplary foreign material object library 300 comprising object 310a-d. Although the objects 310a-d shown in FIG. 3 are shown, for the sake of simplicity, as having uniform coloring and texturing, usually the objects in foreign material object library 300 would comprise the actual image of the object, i.e., an image of a dog for object 310a, an image of a cat for image 310b, an image of a tree for image 310c, and an image of a heart for image 310d.

Shape Library

The shape library may be a set of shapes defined, e.g., by an ordered set of points. Shapes may be defined in other ways. Shapes may be computer generated or obtained from a shape library on the Internet or from other sources. One exemplary shape library may be the COCO dataset, located as of Mar. 22, 2022 at https://cocodataset.org/. Additionally, shapes may be computer-generated using a stochastic algorithm. Many such algorithms for random shape generation exist and are freely available and are beyond the scope of this disclosure. One exemplary shape generation algorithm may begin by seeding the algorithm with a random 3-vertex polygon (i.e., a triangle) and evolving the shape into a random shape by repeatedly cutting a vertex and replacing it with two new randomly chosen vertices until a stopping point is reached. The shape library may comprise a varying number of shapes. In one exemplary embodiment, the shape library may comprise 10,000-30,000 shapes.

Figure 4:
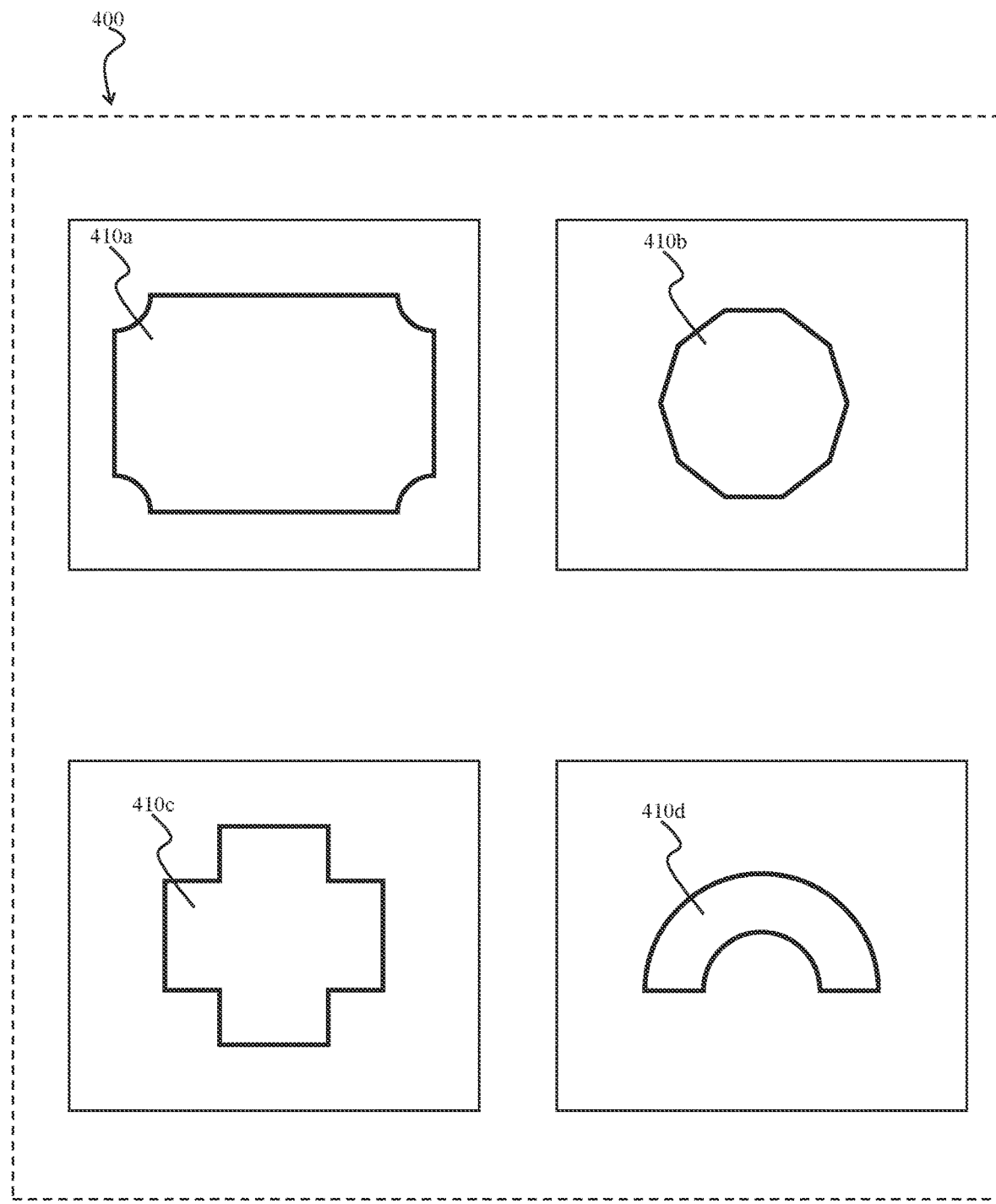
FIG. 4 shows an exemplary shape library.

FIG. 4 shows an exemplary shape library 400 comprising shapes 410a-d.

Texture Library

The texture library may comprise a set of images defining various textures. Many such texture libraries are available on the Internet or from other sources. One exemplary object library may be the Describable Textures Dataset, located as of Mar. 22, 2022 at https://www.robots.ox.ac.uk/~vgg/data/dtd/. In one exemplary embodiment, the texture library may comprise thousands or tens of thousands of textures. The number of textures in the shape library may vary. In addition to naturally occurring and other textures, in some embodiments the texture library may include solid colors, color gradients, and/or computer-generated geometric patterns and color schemes.

Figure 5:
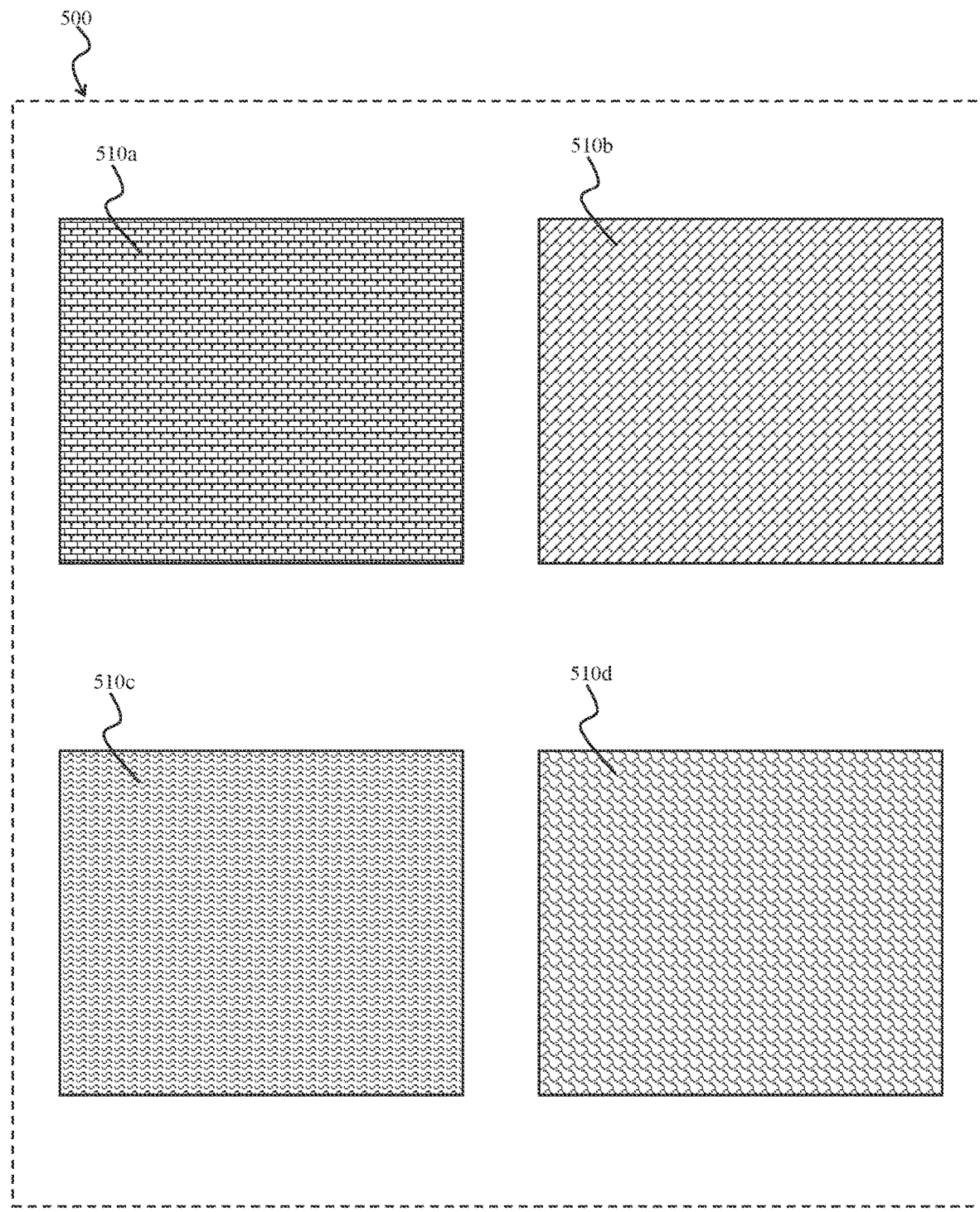
FIG. 5 shows an exemplary texture library.

FIG. 5 shows an exemplary texture library 500 comprising textures 510a-d.

Hair Library

A hair library may comprise a hair shape/strand and may be segmented similar to the foreign material object library or may be otherwise described/defined. In another embodiment, hairs may be generated dynamically using Bezier curves, which in turn may be defined by a variation of traditional Bernstein polynomials.

The variated Bernstein polynomial may be defined by:

$$b_{i,n}(t) = \binom{n}{i} \cdot t^{(n-i)} \cdot (1-t)^i$$

where
$i \in [0, n] \in \mathbb{N}$, and
$n \in \mathbb{N}$.
The Bézier curve is defined by:

$$B(t) = \sum_{i=0}^{n-1} b_{i,n-1}(t) \cdot P_i$$

where
$b_{i,n}$ (t) is the Bernstein polynomial as defined above,
$n \in \mathbb{N}$ and represents the number of control points,
$t \in [0, 1] \in \mathbb{R}$, , and
$P_i$ is the $i^{th}$ control point of the Bézier curve.

The control points may be selected by the user or via a stochastic process and may vary in the number of points generated to produce the structure of the hair. First, the structure of the synthesized hair shape may be produced from the number of control points as determined above. Then, a color may be randomly selected from a list of BGRA colorspace-formatted colors representing differing shades of human hair, e.g., (97,121,151,255), which represents an ash brown hair color.

Figure 6:
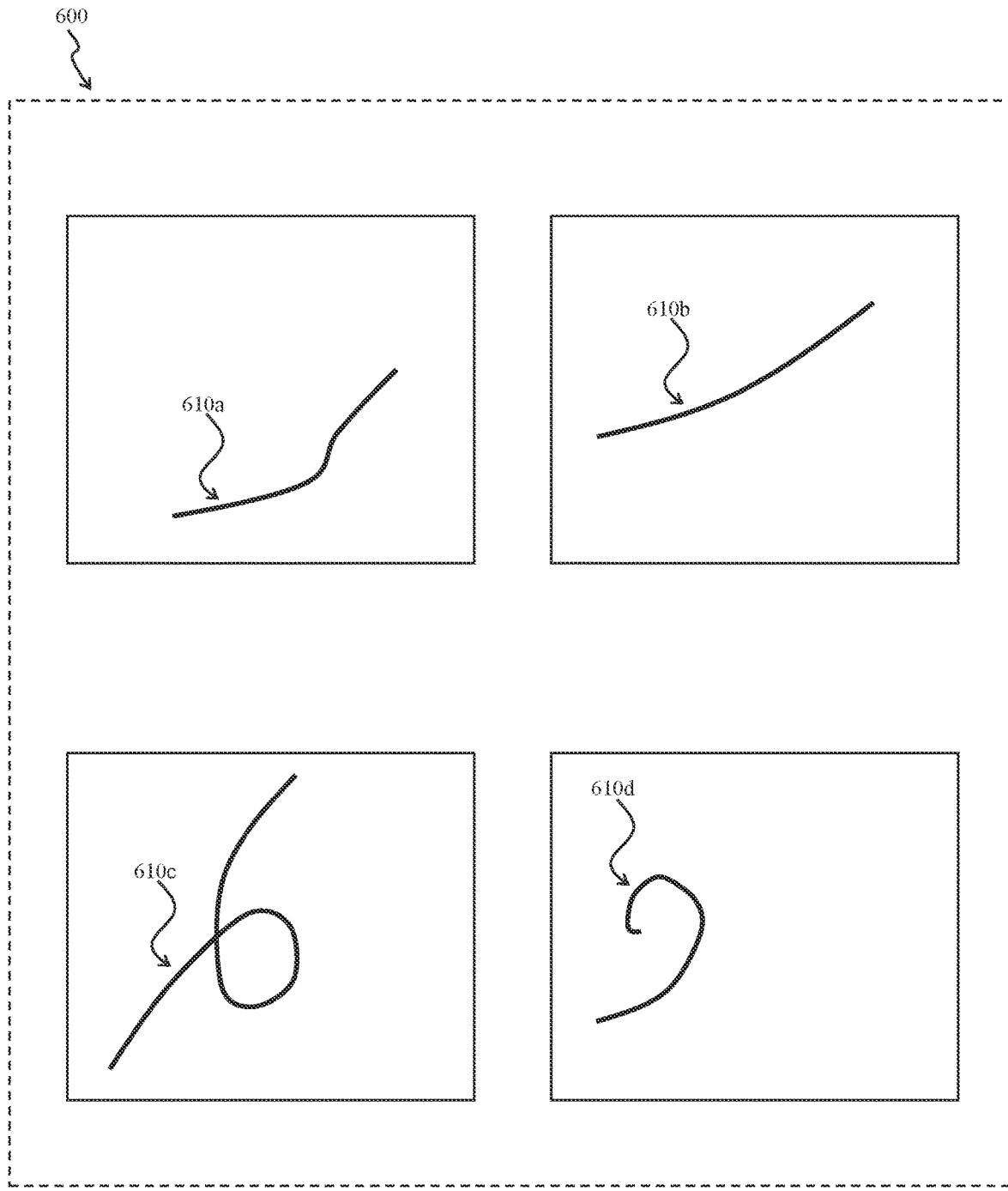
FIG. 6 shows an exemplary hair library.

FIG. 6 shows an exemplary hair library 600 comprising hairs 610a-d.

Although described herein as "libraries," the texture library, shape library, and hair library may alternatively be generated dynamically as necessary and used as described herein below.

Algorithm to Generate Artificially Spiked Dataset

The size of the Artificially Spiked Dataset ("Spiked Dataset") may be predetermined or may be determined dynamically based on some set of criteria. In one embodiment, the size of the Spiked Dataset may be predetermined and may be 10,000. An element of the Spiked Dataset may be referred to as a "spiked image."

Figure 14:
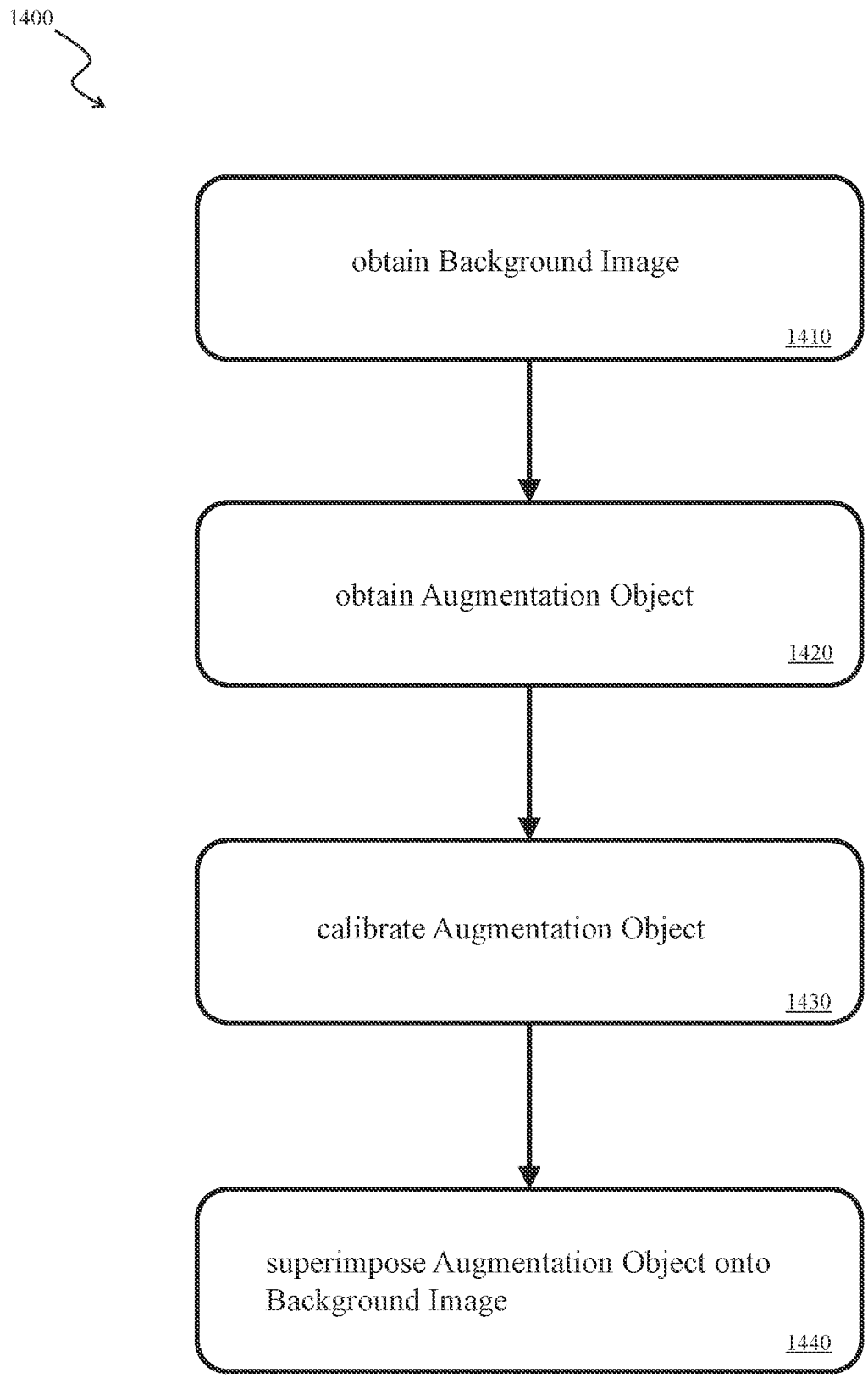
FIG. 14 shows a flowchart for generating a spiked image.

FIG. 14 shows a flowchart 1400 for generating a Spiked Image.

Selection of Background Image

At step 1410, an image is selected from the Class A (no-foreign-material) Images Dataset. This image may be selected randomly according to a probability density function. In one embodiment, the uniform probability density function may be used. Other probability density functions may be used based on problem domain or other factors, e.g., problem domain knowledge that one or more images from the Class A (no-foreign-material) Images Dataset are more significant than others for training the model. The number of uses of one or more images from the Class A (no-foreign-material) Images Dataset for creation of spiked images may be tracked for use in weighting or adjusting the probability density function to favor use of images that have been used less relative to other images.

In some embodiments, the entire selected image may be used. In other embodiments, a sub-region of the selected image may be used. Use of a sub-region may be appropriate, e.g., when the machine learning system is a convolutional neural network (CNN) that may also divide the image into sub-regions. In one embodiment, an image may be divided into a 6×7 grid of 250-pixel×250-pixel squares. The squares may overlap if either dimension of the image is not a multiple of 250. The selected image, or sub-region of the selected image if used, may be referred to herein as the "Background Image."

Selection of Augmentation Object

At step 1420, the ASDGS selects an object for adding to the Background Image. "Adding" the selecting object to the Background Image may alternatively be described as "placing on," "superimposing on," or "assimilating with" the Background Image. This object may be referred to as the "Augmentation Object."

The Augmentation Object may be an object from the Foreign Material Object Library, or a shape from the Shape Library, or a hair from the Hair Library. In general, the determination of which library, and which element of each library, is random. This determination may additionally be based in whole or in part on problem-domain information, may be tuned through trial and error, and/or may be based on other factors. For example, in some applications hair may not be an issue and may therefore not be used. Numerous probability distributions may be used to randomly select an Augmentation Object from these libraries.

The number of uses of one or more Augmentation Objects may be tracked for use in weighting or adjusting the probability density function to favor use of Augmentation Objects that have been used less relative to other Augmentation Objects.

When a shape from the Shape Library is selected as the Augmentation Object, a texture from the texture library may be added to the shape to form the Augmentation Object. In some embodiments, when an object from the Foreign Material Object Library is selected as the Augmentation Objection, a texture from the Texture Library may sometimes (according to a randomness distribution) replace the existing texture.

Calibration

At step 1430, the Augmentation Object may be calibrated relative to the Background Image. In general, calibration has several objectives: (i) introduce randomness to increase the robustness and accuracy of the resulting classification model and (ii) modify/adjust the Augmentation Object so that the image characteristics of the calibrated Augmentation Object are similar to the image characteristics of the Background Image—thereby making the final spiked image appear more "natural" relative to real-world captured images from the processing stream. This may make the Augmentation Object sufficiently similar to the Background Image so that the training in the machine learning system is focused on distinguishing significant features, e.g., distinguishing foreign material objects from desirable objects, instead of insignificant features, e.g., color histogram characteristics in a foreign material object that differ from the color histogram characteristics of an image captured in the actual problem domain. The image characteristics that may be altered by calibration include, but are not limited to, noise, blurring, lighting, color matching, object sizing, and transparency.

Calibration Operation: Noise

Noise may be applied to the Augmentation Object. The determination as to whether to add noise, or the parameters or probability distribution with which noise is added, may be based on trial and error or problem domain knowledge (e.g., characteristics of the Class A Training Sample Images).

Many approaches and/or algorithms are known in the art for adding noise, e.g., adding random noise to each pixel by channel (e.g., RGB channels) such that the probability density function for adding such noise is weighted toward slight deviations from the original RGB channel values.

In one embodiment, and in some applications and/or problem domains, noise may provide distortions/alterations to the Augmentation Object such that a neural network or other machine learning system will need to investigate additional features to determine object classification, thereby creating a "harder problem" for the machine learning system to "solve." This may result in a more accurate classification model.

Calibration Operation: Blurring

Blurring may be applied to the Augmentation Object. The determination as to whether to apply blurring, or the parameters or probability distribution with which noise is applied, may be based on trial and error or problem domain knowledge (e.g., characteristics of the Class A Training Sample Images). In one embodiment, blurring may be added to every Augmentation Object (except for hair) by applying a Gaussian kernel to the object. The size of the Gaussian kernel may be selected randomly using, e.g., a uniform randomness distribution with a ceiling on maximum kernel size. For example, in one embodiment, the maximum kernel size may be 20×20 pixels.

Two exemplary blurring algorithms may be:
(a) Gaussian blur using a Gaussian Kernel
(b) Bilateral filter (as defined by C. Tomasi and R. Manduchi, "Bilateral Filtering for Gray and Color Images", *Proceedings of the* 1998 *IEEE International Conference on Computer Vision*, Bombay, India).

In one embodiment, Gaussian blurring may be applied and may use a k×1 Gaussian Kernel, $G_i$, as defined by:

$$G_i = \alpha \cdot e^{-\frac{(i - \frac{(k-1)}{2})^2}{2\sigma^2}} \text{ where } k \in N_{odd},$$

$i \in [0, k-1]. \alpha$ is the scale factor $\ni \sum_i G_i = 1$, and $\sigma = \frac{(3k-10)}{20}$.

This Gaussian Kernel, $G_i$, may then be convolved with the Augmentation Object to produce a smoothed/blurred version of the Augmentation Object.

In one embodiment, blurring may be important for the Augmentation Object because an object from the Foreign Material Object Library may have high resolution, which may be inappropriate based on problem domain knowledge that a lot of the detailed/finer features in the Foreign Material Object Library do not appear in in the real-world applications and will therefore not be useful for training.

Calibration Operation: Color Matching and/or Lighting Changes

One or more color-matching and/or lighting-matching operations may be applied to the Augmentation Object relative to the Background Image. In general, the purpose of color matching and lighting matching are to align (i.e., make more similar) the coloring and lighting characteristics of the Augmentation Object with the coloring and lighting characteristics of the Background Image so that placement of the Augmentation Object on the Background Image results in realistic coloring and lighting that is more likely to occur in a real-world actual image capture. Many color and lighting operations may be applied, e.g., histogram matching, partial histogram matching, gamma correction, background-foreground thresholding, lightening/darkening, and other color/lighting-related image processing operations known in the art.

In one embodiment, color-matching may comprise histogram matching between the Augmentation Object and the Background Image. Many algorithms are known and may be used for histogram matching. In one embodiment, a channel-wise histogram match of the Augmentation Object to the Background Image may be defined mathematically as follows:

For each RGB channel:
Let $$p_{ao}(v) = \frac{n_v}{n}, v \in [0, 255]$$

describe the frequency with which pixel value v occurs in Augmented Object ao, where $n_v$ is the number of occurrences of pixel value v in ao, and n is the total number of pixels in ao Further, let $S(v_k) = \sum_{i=0}^{k} p_{ao}(v_i)$ be the cumulative occurance function, where $k \in [0,255]$
Further, let $$p_{BI}(v) = \frac{n_v}{n}, v \in [0, 255]$$

describe the frequency with which pixel value v occurs in Background Image BI where $n_v$ is the number of occurrences of pixel value v in BI, and n is the total number of pixels in BI And let $$G(v_k) = \sum_{i=0}^{k} p_{BI}(v_i)$$

be the cumulative occurance function, where $k \in [0,255]$
Then the value $v_i$ of the ith pixel of histogram matched Augmented Object ao' is defined as:

$v_i = G^{-1}(S(v_i))$

Partial histogram matching may be used in conjunction with or in place of histogram matching. This is similar to the histogram matching described above except that a scaling factor $\alpha$ is used:

$v_i = \alpha \cdot G^{-1}(S(v_i)) + (1-\alpha) \cdot v_i$

Another lighting operation that may be used comprises a linear transformation via a scale factor and an additive offset. Using this operation, each RGB pixel (r,g,b) in the Augmentation Object may be lightened or darkened as follows to generate lightened/darkened RGB pixel (r',g',b'):

$(r',g',b') = (\text{truncate}_{[0,255]}(\alpha r + \beta), \text{truncate}_{[0,255]}(\alpha g + \beta), \text{truncate}_{[0,255]}(\alpha b + \beta))$, where $\alpha$ is a scaling factor and $\beta$ is a positive or negative offset.

Scaling factor $\alpha$ and offset $\beta$ may be set be a user, programmatically determined, or randomly determined using a stochastic process. In some embodiments, scaling factor α may default to 1 and offset β may default to 0.

Another operation for lighting changes may be gamma correction, which may be used to make in image appear darker or brighter. Gamma correction may use a look-up-table (LUT):

$$LUT_i = \left(\frac{i}{255}\right)^{\frac{1}{r}} \cdot 255 \text{ where } i \in [0, 255] \in \mathbb{N}$$

$Result_i = LUT_{Input_i}$ where $LUT$ is defined as above

The gamma (γ) value may be determined either by a user or by a stochastic process generated from a range of permissible values (that may be determined by the user).

Another operation for adjusting lighting/coloring of the Augmentation Object relative to the Background Image may be luma value comparison/correction. This may comprise correcting an Augmentation Object so that that the luma signature of the Augmentation Object is similar to, or at least more similar to, the luma signature of the base image from the input dataset. The luma γ' of pixel i may be defined as:

$y'_i = 0.114 \cdot b_i + 0.587 \cdot g_i + 0.299 \cdot r_i$, where $y'_i$ is the luma value at pixel i, and
$b_i$, $g_i$, and $r_i$ are the blue, green, and red values at pixel i, respectively.

The average luma value $\overline{y}'_D$ for an image may be defined as:

$$\overline{y}' = \frac{1}{n}\sum_{i=n}^{n} y'_i,$$

where n is the number of pixels.

Augmented Object D may be luma-corrected relative to Background Image B as follows:

For each pixel i=($b_i$, $g_i$, $r_i$) in Augmented Object image D, corresponding pixel i=($b'_i$, $g'_i$, $r'_i$) in luma-corrected output image D' may be computed as:

$$(b'_i, g'_i, r'_i) = (f \cdot 0.114 \cdot b_i, f \cdot 0.587 \cdot g_i, f \cdot 0.299 \cdot r_i),$$

$$\text{where } f = 1 + \frac{\overline{y}'_B - \overline{y}'_D}{255}$$

Another color matching operation (for matching the coloring of the Augmentation Object with the coloring of the Background Image) may be based on foreground/background thresholding. For this operation, a binary Otsu thresholding may be performed on each channel of the Background Image to separate the foreground from the background. Next, the Augmentation Object may be matched to either the foreground or background of the Background Image based on channel-wise color prevalence in the Augmentation Object of the Background Image's background and/or foreground colors. Finally, for each channel the difference between the Background Image mean (using the foreground or background as determined above) and Augmentation Object mean is calculated and this difference is added to each pixel of the Augmentation Object—truncating as may be appropriate to keep the RGB values within the appropriate range—which is usually [0,255].

Another color matching operation may be arithmetic mean adjustment. RGB channel means for each of the Augmentation Object and the Background Image may be computed. The RGB-wise differences between the Background Image's respective RGB means and the Augmentation Object's respective RGB means the respective RGB means may be used to offset the RGB values at each pixel of the Augmentation Object, truncating to the RGB range, which is often [0,255].

Calibration Operation: Rotation

The Augmentation Object may be randomly rotated, e.g., use a uniform distribution to randomly select a number of rotation degrees from 0 to 360.

Calibration Operation: Flip

The Augmentation Object may be randomly flipped based on a uniformly distributed binary random variable. The flip may be horizontal, vertical, or around an axis oriented in another direction. Because a random rotation is also applied, the flip axis is irrelevant. If a random rotation is not applied, or it other factors dictate a need, the flip axis may be fixed and/or one or more flips may be applied.

Calibration: Hair

An Augmentation Object that is from the Hair Library may be treated differently from an Augmentation Object that is from the Foreign Material Object Library or the Shape Library. In some embodiments, noise, blurring, and color matching may not be appropriate for a hair, even though rotation and flipping may be appropriate.

Adding Augmentation Object to Background Image

At step 1440, the ASDGS may add the calibrated Augmentation Object to the Background Image.

The ASDGS may select a location within the Background Image for placement of the Augmentation Object. Many algorithms and/or approaches may be used for locating the Augmentation Objection within/on the Background Image. In one embodiment, an anchor point within or spatially related to the Augmentation Object may be selected. The anchor point may have as its x coordinate the average x-value of all pixels in the Augmentation Object, and as its y coordinate the average y-value of all the pixels in the Augmentation Object. The ASDGS may select a location for the anchor point relative to the Background Image. This may be referred to as the Background Anchor. In one embodiment, the Background Anchor may be (assuming a rectangular Background Image), a randomly selected x value and a randomly selected y value within the Background Image. The Augmentation Object may be placed so that its anchor point coincides with the Background Anchor.

The ASDGS may randomly resize the Augmentation Object to make it "fit" better with the Background Image. In one embodiment, a target relative size ratio or range may be selected, and the Augmentation Object may be resized to fit within the target size range. For example, a target size ratio of 30% may indicate that the number of pixels of the Augmentation Object that are over the Background image when the Augmentation Object is located so that its anchor point is at the Background Anchor is 30% of the total number of pixels in the Background Image. If the size ratio at the selected Background Anchor is greater than or less than the target ratio, then the Augmentation Object may be resized (usually through an interpolation algorithm) so that the size ratio is equal to or closer to the target ratio. The resizing process may be iterative. In some embodiments, the target size ratio may be random so that the target ratio is not the same for each spiked image.

Resizing of the Augmentation Object relative to the Background Image may be performed in many other ways. For example, another resizing algorithm may use a stochastically determined Beta distribution function-comparing the relative sizes (i.e., areas) of the Background Image and Augmentation Object, and then resizing the Augmentation Object based on the comparison. A Beta distribution may be utilized to force a non-uniform distribution that is skewed to favor a smaller Augmentation Object being scaled up and a larger Augmentation Object being scaled down relative to the Background Image. This operation may be represented mathematically as follows:

$$\text{Let } \sigma = \sum_i \Psi(src_i), \text{ where } \Psi(x_i) = \begin{cases} 0 & x_i \text{ is zero} \\ 1 & \text{otherwise} \end{cases}.$$

$$\text{Let } r = \frac{\sigma}{A} \text{ and } s = \frac{1}{r},$$

where A is the area of the image,
Let $$\lambda_\theta = \frac{\kappa}{\sigma} \text{ and } \upsilon_\theta = \sqrt{\frac{1}{\lambda_0}},$$

where $\kappa$ is some constant.
Let $$\varphi_0 = e^{\upsilon_0^{21_a}},$$

$v_1 = \sqrt{v_0 \cdot \varphi_0}$,
$\varphi_1 = \min(\varphi_0, v_1)$, and
$\lambda_1 = \lambda_0 \cdot \varphi_1$,
Let $a = \sqrt{s}$ and $\beta = \sqrt{r}$.
Then let us define a random variable L, such that $L \sim |B(\alpha, \beta) \cdot \varphi_1|$ and bounded by $[\lambda_1, v_1]$, where $B(\alpha, \beta)$ is the Beta distribution defined by $$\frac{\Gamma(\alpha + \beta)}{\Gamma(\alpha) \cdot \Gamma(\beta)} \cdot x^{\alpha-1} \cdot (1-x)^{\beta-1},$$

where $\Gamma(z)$ is the gamma function.

In some embodiments, based on problem-domain knowledge, or trial and error, or tuning, or other factors, it may be beneficial to make the target ratio as small as possible (while still ensuring that the system performs well and does not fail) because smaller foreign object features may result in better model training. The target ratio may additionally depend on the size of the Background Image.

The calibrated Augmentation Object may be superimposed onto the Background Image by placing the calibrated Augmentation Object onto the Background Image such that the calibrated Augmentation Object's anchor point is located at the Background Image's Background Anchor. Any pixels of the calibrated Augmentation Object that fall outside of the Background Image may be cropped.

Transparency may be applied to the calibrated Augmentation Object as superimposed on the Background Image. Several methods for applying transparency are known in the art. One method is alpha channel manipulation. In one embodiment, a random transparency factor number (0.0 being no transparency and 1.0 being full transparency) between a predetermined minimum transparency and maximum transparency may be used for each pixel in the Augmentation Object as superimposed onto the Background Image. For example, a random number in the transparency value range 0.00-0.20 may be selected based on a uniform randomness distribution. In some applications, no transparency may be applied. In other applications, the transparency value range and randomness distribution may be adjusted and/or tuned based on problem domain knowledge or other factors. One of the benefits of applying transparency is promotion of the model's ability to detect semi-transparent objects, e.g., plastic and/or glass.

Edge blending may be applied to the edge of the calibrated Augmentation Object as superimposed on the Background Image. This may make the Augmentation Object look more natural on the background of the Background Image, i.e., to make the object look less "Photoshopped." Several algorithms are known (or may become generally known) and may be used to apply edge blending. For example, Alpha channel manipulation may be applied to the edge of the calibrated Augmentation Object.

Another approach for edge blending may be referred to as "non-linear image blending." This algorithm may comprise blending each pixel of the calibrated Augmentation Object with the underlying pixel of the Background Image, wherein the weight ascribed to the respective pixels depends on the distance of the pixel location from the nearest edge pixel of the calibrated Augmentation Object. For convenience, these weights may be normalized from 0 to 1. A function w(d) may provide the relative weights for blending:

Let $O_{(x,y)} = (r_{O,(x,y)}, g_{O,(x,y)}, b_{O,(x,y)})$ be the RGB value of calibrated Augmentation Object at pixel location (x, y)

Let $BI_{(x,y)} = (r_{BI,(x,y)}, g_{BI,(x,y)}, b_{BI,(x,y)})$ be the RGB value of the Background Image at pixel location (x, y),
wherein the coordinates of pixel location (x,y) relative to the Background Image, and $$\text{let } w(d) = \begin{cases} 0.90 & d = 1 \\ 0.97 & d = 2 \\ 0.99 & d = 3 \\ 1 & \text{otherwise} \end{cases}$$

be the weighting function where the input d is the distance in pixels from (x,y) to the nearest edge pixel of calibrated Augmentation Object.

The blended RGB color value of the pixel inside calibrated Augmentation Object at location (x,y) having a pixel distance of d pixels to the nearest edge pixel of calibrated Augmentation Object may be computed as:

$BC_{(x,y)} = ((w\ d)*r_{O,(x,y)}) + ((1-w(d))*r_{BI,(x,y)}), (w(d)*g_{O,(x,y)}) + ((1-w(d))*g_{BI,(x,y)}), (w(d)*b_{O,(x,y)}) + ((1-w(d))*b_{BI,(x,y)}))$

The weighting function w(d) may be modified and/or may be based on incorporation of randomness.

Edge blending may similarly be applied to the Background Image at or near the edge of the Augmentation Object.

In some embodiments, the algorithm for adding a calibrated hair may be different from the algorithm for adding a calibrated object from the Foreign Material Object Library or from the Shape Library. For example, the resulting Bézier curve as described above for hair generation may be added to the input image via, e.g., Wu Xiaolin's antialiasing algorithm (Wu, Xiaolin (July 1991). "An efficient antialiasing technique". *Computer Graphics* (publication). 25 (4): 143-152. doi:10.1145/127719.122734. ISBN 0-89791-436-8). Additionally, the resulting hair image may be resized via a modified nearest-neighbor interpolation calculated according to pixel area relation rather than simple pixel sampling—which may produce Moiré-free results in the output image prior to being interpolated with the input image.

The Background Image, with the added Augmentation Object, may be referred to as a "spiked image."

In some embodiments, de-noising may be performed on the spiked image. The need for de-noising may depend upon the problem domain and other factors.

In some embodiments, the spiked image may be blurred. This blurring may promote robustness in the classification model because, e.g., the camera capturing images for classification may be temporarily or permanently out of focus and may therefore be providing blurry or slightly blurry images to the classification model. If the classification model is the result of training on both sharp and blurry images, it will be better able to correctly classify blurry images.

In some embodiments, blur detection/correction may be performed on the spiked image. The determination of whether to perform this operation may be based on problem-domain knowledge. This operation may comprise, for each channel, first convolving the channel with the standard Laplacian kernel to calculate variance:

$$K_L = \begin{bmatrix} 0 & 1 & 0 \\ 1 & -4 & 1 \\ 0 & 1 & 0 \end{bmatrix}$$

Next, the variance, which may also be referred to as a blur value, may be used to do a deconvolution of the of the blurring of the image using the following equations:

$$\hat{f}_{k+1}(x, y) = \hat{f}_k(x, y) \cdot \left[ \frac{1}{\sqrt{b}} \cdot h(-x, -y) * \frac{g(x, y)}{h(x, y) * \hat{f}_k(x, y)} \right] \text{ where}$$

$$g(x, y) = h(x, y) * f(x, y) = \sum_{i=-a}^{a} \sum_{j=-b}^{b} h(i, j) \cdot f(x + i, y + j).$$

f is the source image, $\hat{f}$ is the distortion free image,
h is the blurring function that distorted the image.
g is the blurred result image, and b is the blur factor determined prior.

In one embodiment, an operation such as GP-GAN may be used to make the gradient of the Augmented Object mesh better with the gradient of the Background Image. This operation may be based on the paper GP-GAN: *Towards Realistic High-Resolution Image Blending* by Huikai Wu, Shuai Zheng, Junge Zhang, and Kaiqi Huang (2019) (https://www.arxiv-vanity.com/papers/1703.07195/; Proceedings of the 27th ACM International Conference on Multimedia). This paper is incorporated herein by reference. In addition to doing the Laplacian pyramid in the Blending Gan G(x), as described in the paper referenced above, a random Laplacian pyramid may be performed on the gradient of the image prior to the Poisson constraint as well as randomly performing a gradient on the output of G(x) prior to the color constraint step:

Let $H(x_h) = P(x_h) + \beta C(x_h) + \gamma P'(x_h) + \delta C'(x_h)$ where $P(x_h)$, $C(x_h)$, and $\beta$ are defined as in the paper, and $$P'(x_h) = \int_T \|\Delta v - x_h\|_2^2 dt,$$

$$C'(x_h) = \int_T \|g(x_h) - \Delta \tilde{x}_l\|_2^2 dt, \text{ and}$$

$\gamma$ and $\delta$ are normalizing constants.

Using this approach, the gradients of both images may mesh better and have a more seamless integration. The determination as to whether to apply this operation may depend on problem-domain information.

When the algorithm has been run a sufficient number of times to generate the desired number of elements for the Artificially Spiked Dataset, the Artificially Spiked Dataset may be used as an input to a machine learning system to train a classification model.

Although the description herein focuses on adding one Augmentation Object to a Background Image, in some embodiments multiple Augmentation Objects may be added to a Background Image.

Generating Spiked Images: Examples

Figure 7:
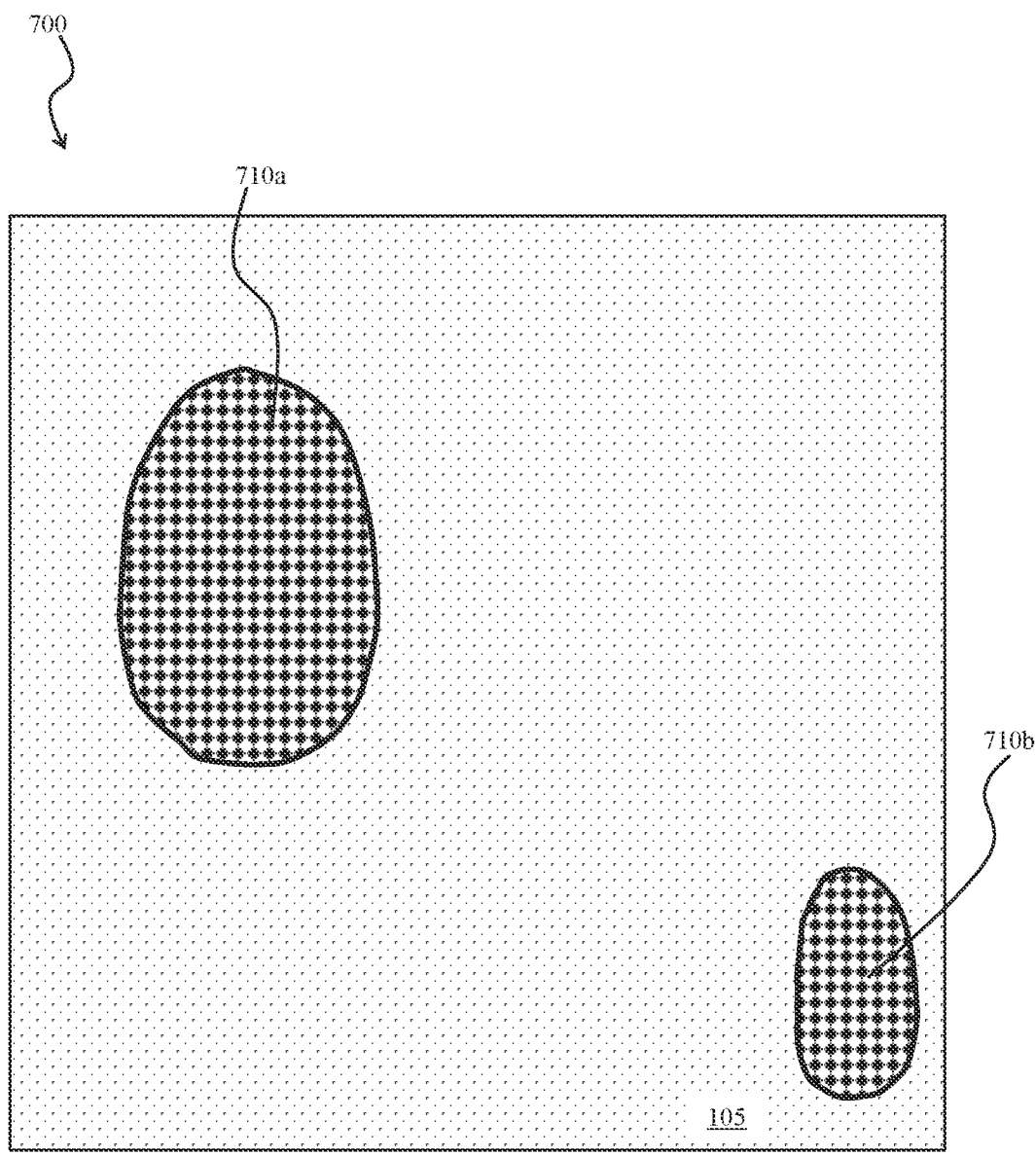
FIG. 7 shows an exemplary Background Image.

FIGS. 7-13 show several exemplary calibrations. Although the ASDGS usually selects a different Background Image for each Spiked Image, the exemplary Background Image 700 in FIG. 7 is used with FIGS. 8-13 to illustrate generation of three Spiked Images for an object from the Foreign Material Object Library, a shape from the Shape Library, and a hair from the Hair Library, respectively. FIG. 7 shows Background Image 700, which shows potatoes 710*a* and 710*b* and conveyance surface 105.

As shown in FIGS. 8A-C and 11A-E, the ASDGS may select Background Image 700 and object 310*a* (dog image) from Foreign Material Object Library 300 for generation of a spiked image.

Figure 8A:
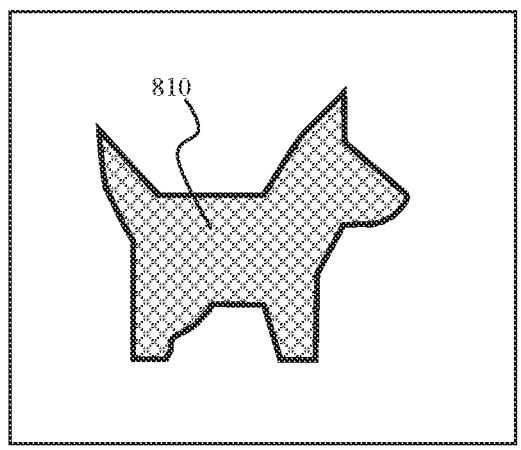
FIGS. 8A-C show an exemplary calibration of an exemplary object.
Figure 8B:
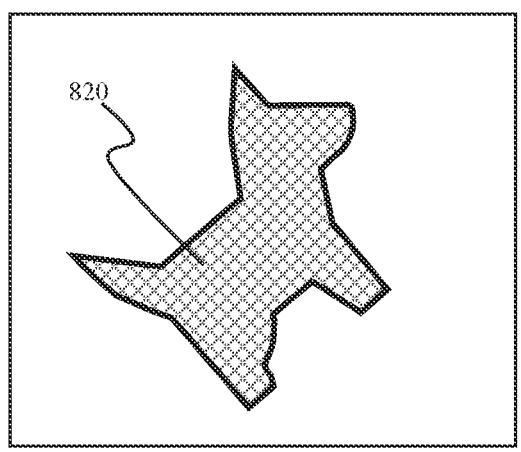
Figure 8C:
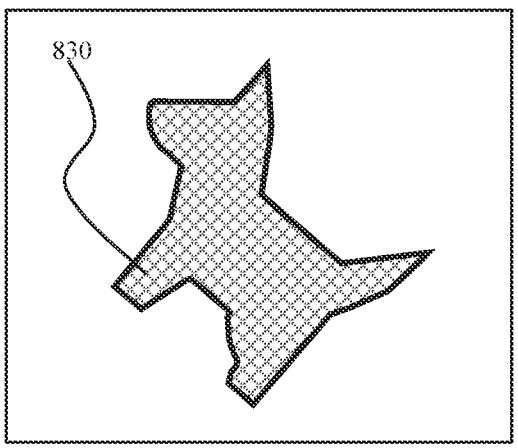

FIGS. 8A-C illustrate the results of an exemplary calibration. As shown in FIG. 8A, object 310*a* (dog image) may be randomly selected for adding to Background Image 700 to generate a spiked image. FIG. 8B shows object 820, which is a random rotation of object 810. FIG. 8C shows object 830, which is a random horizontal flip of object 820. Other calibration operations, as disclosed herein, may also be performed.

Figure 11A:
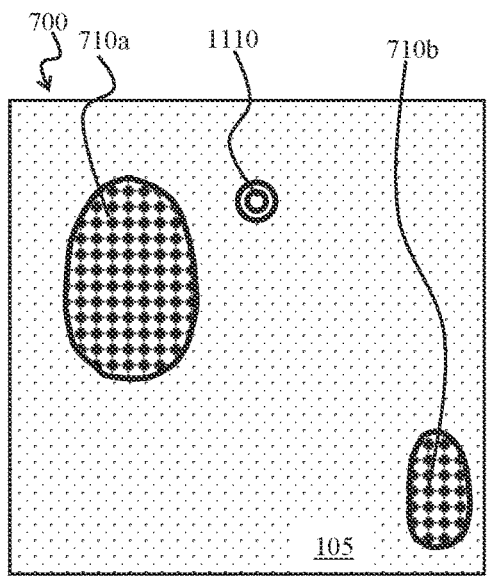
FIGS. 11A-E show an exemplary addition of a foreign material object to a Background Image.
Figure 11B:
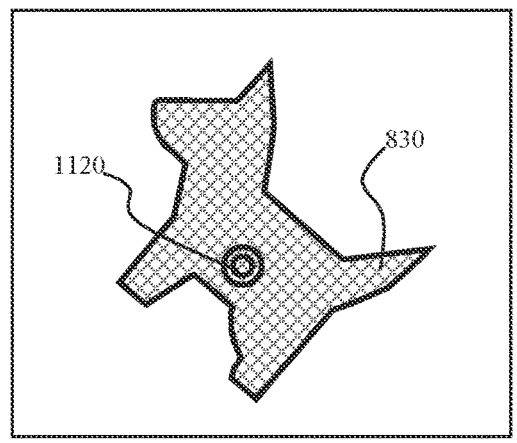
Figure 11C:
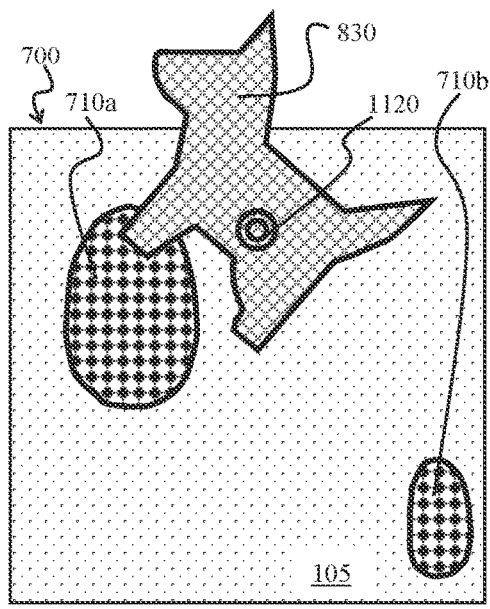
Figure 11D:
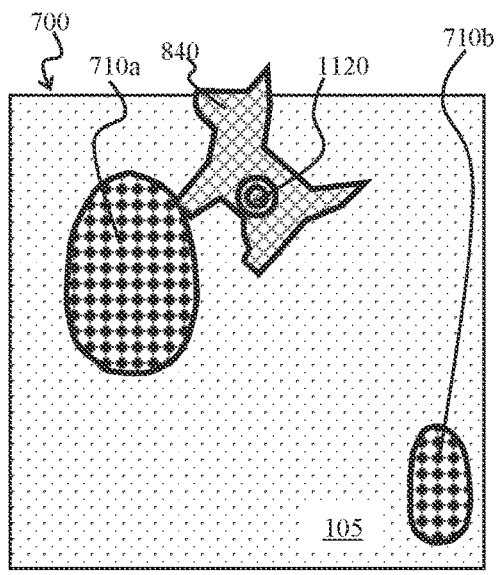
Figure 11E:
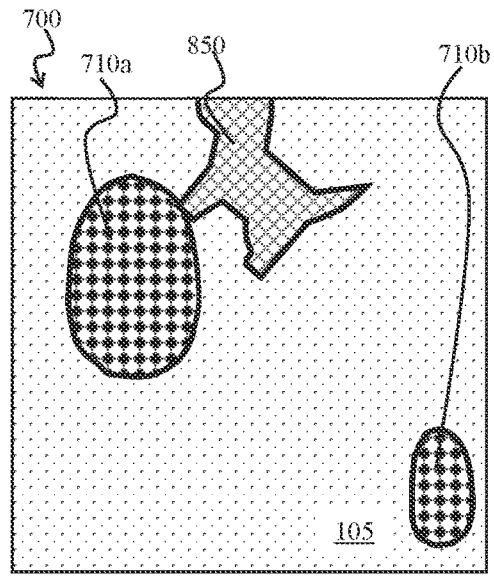

FIGS. 11A-E illustrate an exemplary addition of calibrated Augmentation Object 830 to Background Image 700. As shown in FIG. 11A, ASDGS may randomly select Background Anchor 1110 for placement of calibrated Augmentation Object 830 in Background Image 700. As shown in FIG. 11B, ASDGS may select anchor point 1120 as the anchor point of calibrated Augmentation Object 830. FIG. 11C shows an initial addition of calibrated Augmentation Object 830 to Background Image 700 at Background Anchor 1110. FIG. 11D shows a resizing of calibrated Augmentation Object 830 to become calibrated Augmentation Object 840 in Background Image 700. FIG. 11E shows a cropping of calibrated Augmentation Object 840 to become calibrated Augmentation Object 850 in Background Image 700. Other operations for adding calibrated Augmentation Object 830 to Background Image 700—as disclosed herein—may also be performed.

Figure 9A:
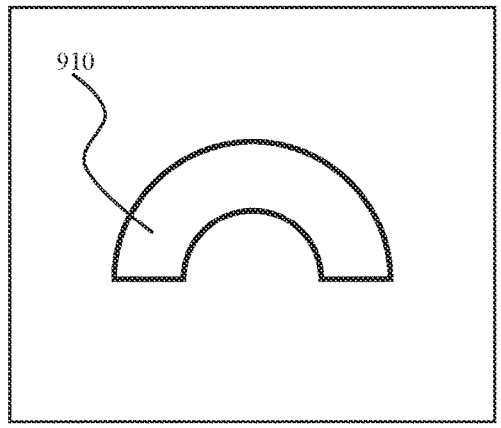
FIGS. 9A-E show an exemplary calibration of an exemplary shape.
Figure 9B:
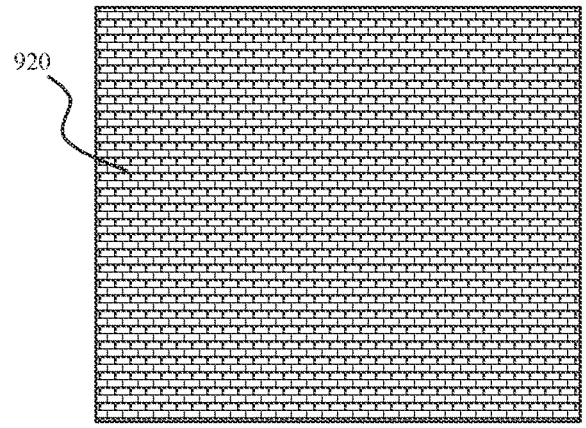
Figure 9C:
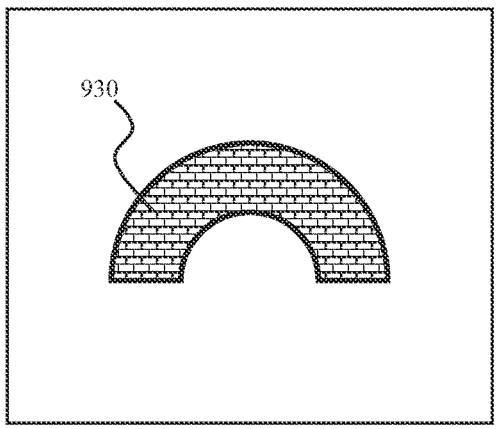
Figure 9D:
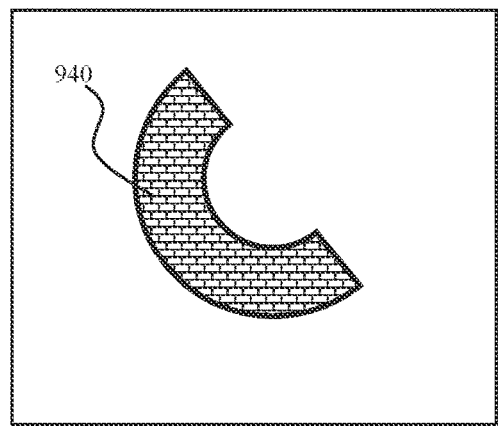
Figure 9E:
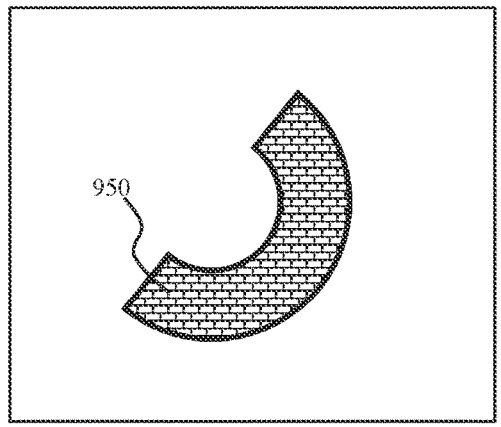

FIGS. 9A-C illustrate the results of another exemplary calibration. As shown in FIG. 9A, shape 910 may be randomly selected from shape library 400 for addition to Background Image 700 to generate a spiked image. FIG. 9B shows a randomly selected texture (510a from texture library 500) for adding texture to shape 930. FIG. 9C shows shape 930, which is shape 910 with texture 920 applied. FIG. 9D shows shape object 940, which is a random rotation of object 930. FIG. 8D shows object 950, which is a random horizontal flip of object 940. Other calibration operations, as disclosed herein, may also be performed.

Figure 12A:
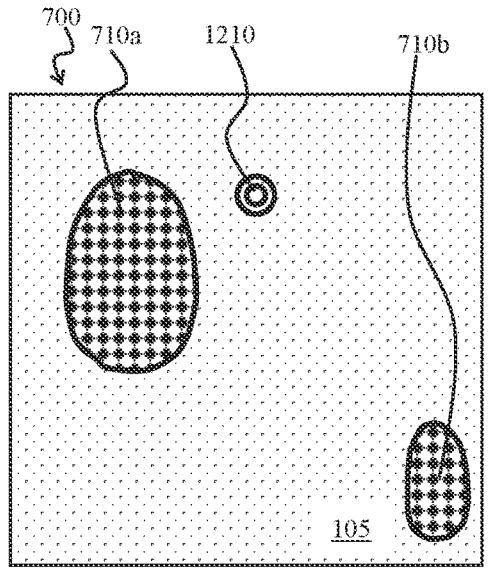
FIGS. 12A-D show an exemplary addition of a shape to a Background Image.
Figure 12B:
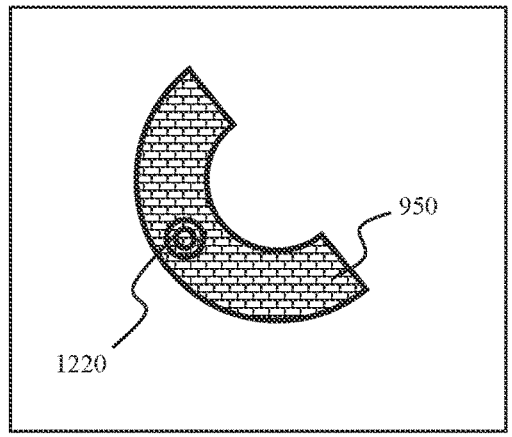
Figure 12C:
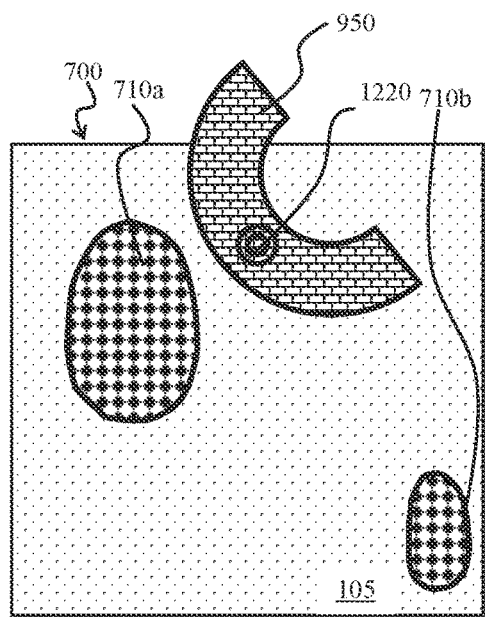
Figure 12D:
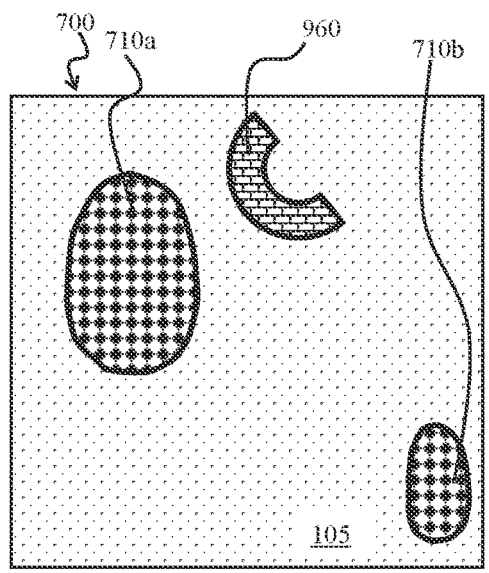

FIGS. 12A-D illustrate an exemplary addition of calibrated Augmentation Object 950 to Background Image 700. As shown in FIG. 12A, ASDGS may randomly select Background Anchor 1210 for placement of calibrated Augmentation Object 950 in Background Image 700. As shown in FIG. 12B, ASDGS may select anchor point 1220 as the anchor point of calibrated Augmentation Object 950. FIG. 12C shows an initial addition of calibrated Augmentation Object 950 to Background Image 700 at Background Anchor 1210. FIG. 12D shows a resizing of calibrated Augmentation Object 950 to become calibrated Augmentation Object 960 in Background Image 700. Other operations for adding calibrated Augmentation Object 950 to Background Image 700—as disclosed herein—may also be performed.

Figure 10A:
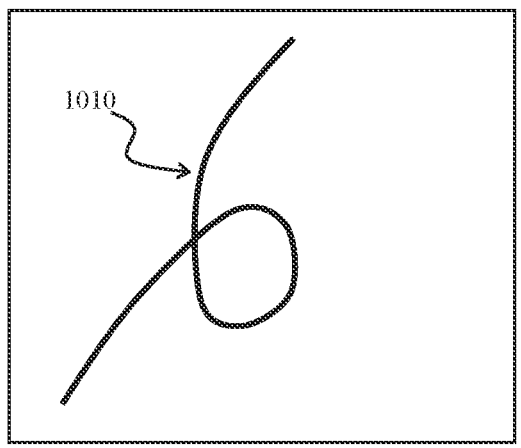
FIGS. 10A-C show an exemplary calibration of an exemplary hair.
Figure 10B:
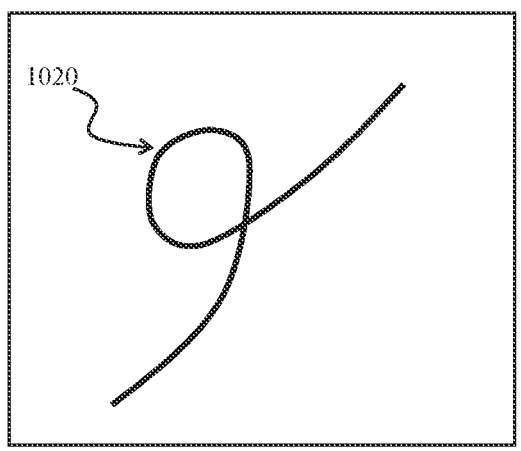
Figure 10C:
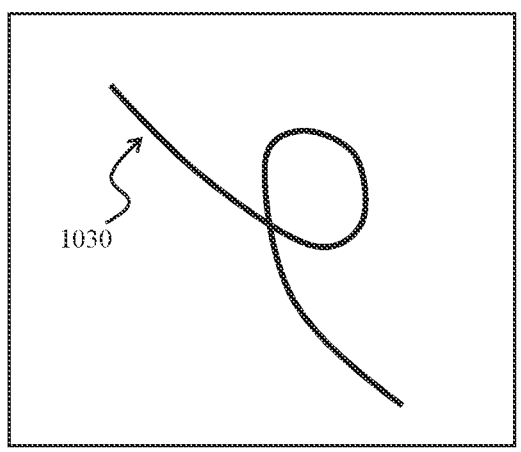

FIGS. 10A-C illustrate the results of another exemplary calibration. As shown in FIG. 10A, hair 1010 may be randomly selected from hair library 600 for addition to Background Image 700 to generate a spiked image. FIG. 10B shows hair 1020, which is a random rotation of hair 1010. FIG. 10C shows hair 1030, which is a random horizontal flip of hair 1020. Other calibration operations, as disclosed herein, may also be performed.

Figure 13A:
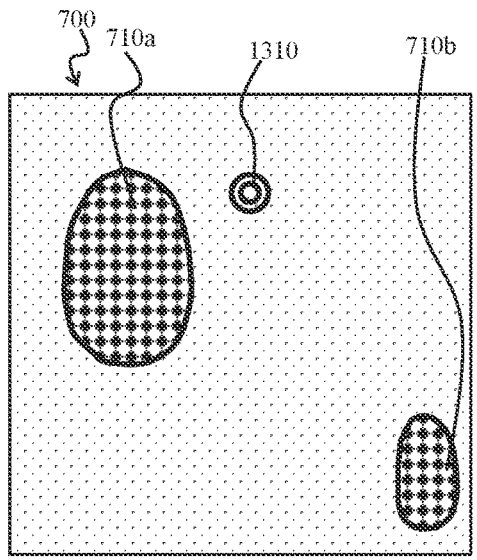
FIGS. 13A-D show an exemplary addition of a hair to a Background Image.
Figure 13B:
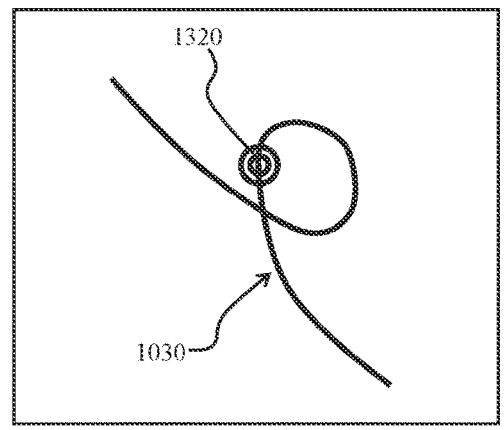
Figure 13C:
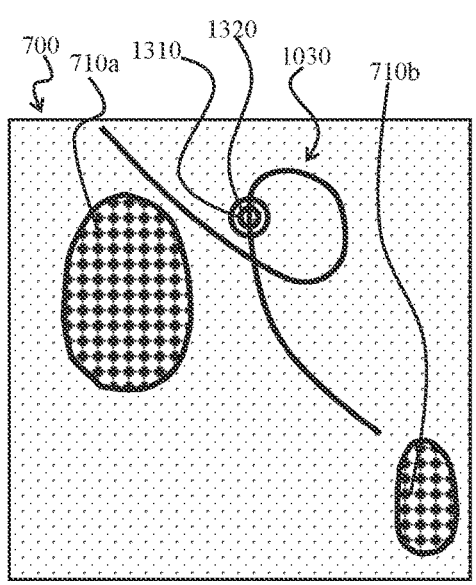
Figure 13D:
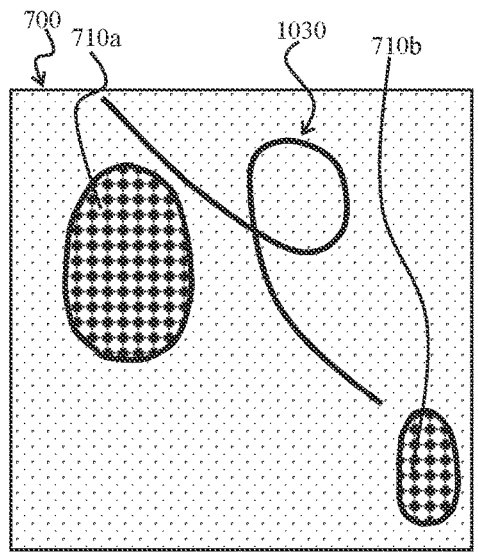

FIGS. 13A-D illustrate an exemplary addition of calibrated Augmentation Object 1030 to Background Image 700. As shown in FIG. 13A, ASDGS may randomly select Background Anchor 1310 for placement of calibrated Augmentation Object 1030 in Background Image 700. As shown in FIG. 13B, ASDGS may select anchor point 1320 as the anchor point of calibrated Augmentation Object 1320. FIG. 13C shows an initial addition of calibrated Augmentation Object 1030 to Background Image 700 at Background Anchor 1310. FIG. 13D shows the placement of calibrated Augmentation Object 1030 without any resizing or cropping. Other operations for adding calibrated Augmentation Object 1030 to Background Image 700—as disclosed herein—may also be performed.

Generating Artificially Spiked Image Dataset, Using Artificially Spiked Image Dataset to Train Classification Model, and Using Classification Model.

Figure 15:
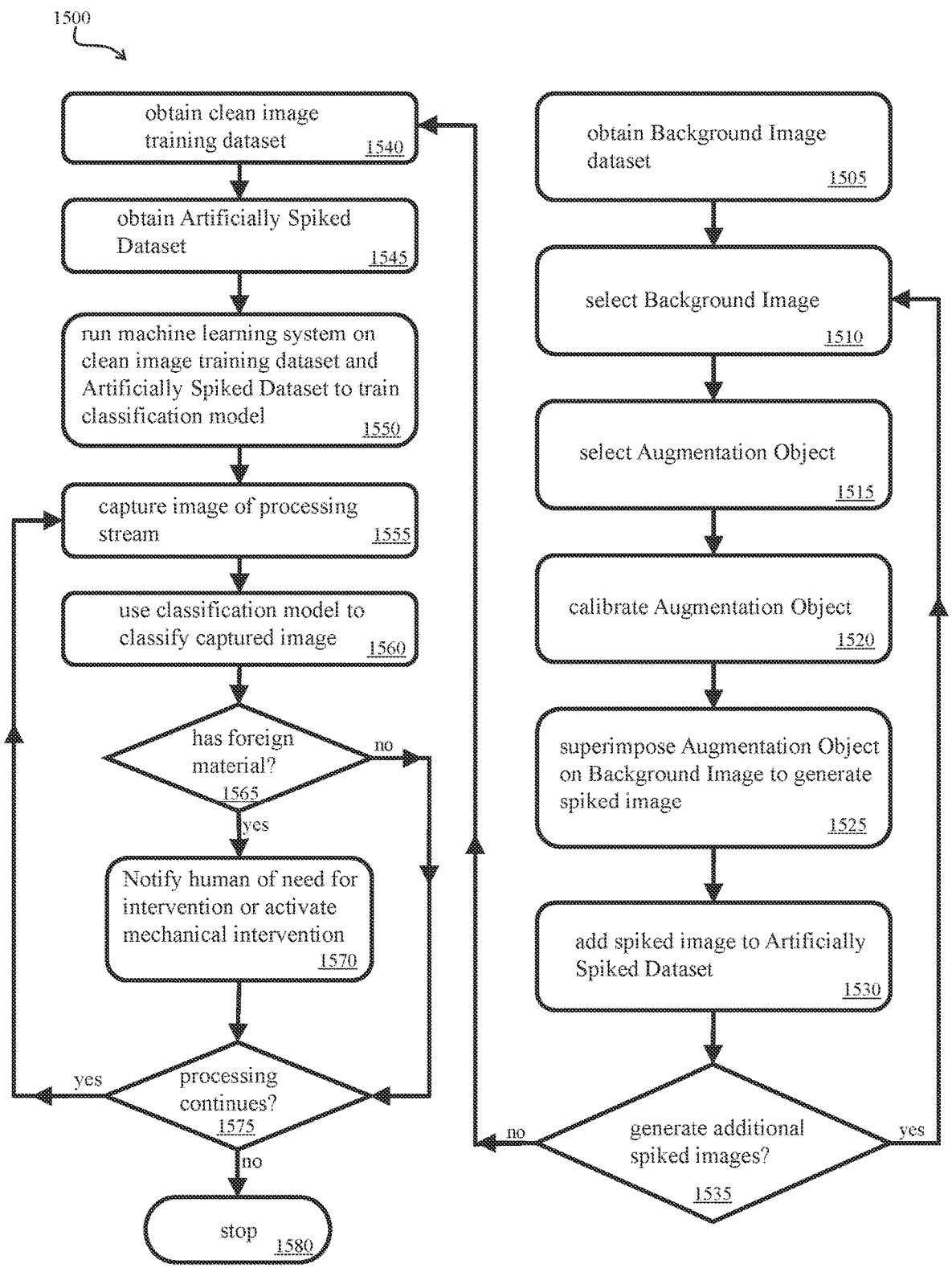
FIG. 15 shows a flowchart for generating a set of spiked images, training a classification model, and using the classification model to classify captured images.

FIG. 15 shows a flowchart 1500 for generating a dataset of spiked images, using the spiked images to train a classification model, and then using the classification model.

At step 1505, the ASDGS may obtain a set of Background Images comprising known class A (no-foreign-material) images.

At step 1510, the ASDGS may select (e.g., by random selection) a Background Image from the Background Image dataset.

At step 1515, the ASDGS may randomly select an Augmentation Object from the foreign material object library, shape library, or hair library.

At step 1520, the ASDGS may calibrate the Augmentation Objection as described herein.

At step 1525, the ASDGS may add (i.e., superimpose) the calibrated Augmentation Object to the Background Image to generate an artificially spiked image.

At step 1530, the ASDGS may add the spiked image to a dataset of artificially spiked images, which may be referred to as the "Artificially Spiked Image Dataset."

At step 1535, the ASDGS may determine whether it has created a sufficient number of artificially spiked images. This determination is often based on reaching a predefined number of artificially spiked images. This number may be based on characteristics of the problem domain and other factors, e.g., computational resources, classification accuracy requirements, etc.

If the ASDGS determines at step 1535 that additional artificially spiked images should be generated, then the ASDGS returns to step 1510.

If the ADGS determines at step 1535 that it is not necessary to generate one or more additional artificially spiked images, then processing continues to 1540.

At step 1540 a machine learning system may obtain a dataset comprising known class A (no-foreign-material) images ("Clean Dataset"), which may comprise some or all of the Background Image Dataset.

At step 1545, the machine learning system may obtain the Artificially Spiked Dataset from the ASDGS.

At step 1550, the machine learning system may use the Clean Dataset and the Artificially Spiked Dataset to train a classification model. Many machine learning systems are known in the art and may be used. In one embodiment, a convolutional neural network ("CNN") may be used. In another embodiment, a YOLO ("You Only Look Once") machine learning system may be used. Many other machine learning systems may be to train a classification model based on the Artificially Spiked Dataset and the Clean Dataset.

At step 1555, a processing control system may capture an image of a processing stream, i.e., a real-world image from a production processing stream. A camera may be positioned to capture images of a stream of, e.g., potatoes on a conveyance system, e.g., a conveyor belt. A captured image of the potato processing stream may be transmitted or otherwise input to the classification model.

At step 1560, the processing control system may use the classification model to classify the captured image. In some embodiments, a captured image may be subdivided prior to being input to the classification model. For example, the captured image may be divided into 250-pixel×250-pixel sub-images (which may be overlapping). This may be beneficial for several reasons. First, classifying by sub-images means that the control system will know which sub-image gave rise to has-foreign-material classification, and will therefore allow the control system to direct remedial action toward a specific physical location. Second, if the classification model was trained on sub-images, classification may be more accurate when performed on similarly sized sub-images. Other benefits may also apply.

At step 1565, the processing control system may make a decision based on the classification from the classification model. If the classification model determines that the captured image does not have foreign material (class no-foreign-material), then the processing control system may proceed to step 1575 to determine whether further images should be captured. If the classification model determines that the captured image does have foreign material (class has-foreign-material), then the processing control system may proceed to step 1570 to notify a human that intervention is needed (e.g., prepare a visual display of the captured image for presentation to a human and present such visual display to an electronic display), or to activate a mechanical intervention (e.g., removal, ejection, or redirection of the foreign material from the processing stream), or some other action to address the has-foreign-material classification.

After the has-foreign-material classification has been addressed at step 1570, the processing control system will continue to step 1575.

At step 1575, the processing control system may determine whether to return to step 1555 to capture and classify another image. In some embodiments, this may be a simple determination as to whether the conveyance and processing system continues to run. If the processing control system determines to not return to step 1555, then it may proceed to a stop point 1580.

The order in which operations are disclosed herein does not limit or require a particular order or set of dependencies, Instead, unless otherwise explicitly specifically provided herein, the described steps and operations may be performed in any order and some steps may be performed in conjunction with other steps.

Although many of the examples herein use an RGB color scheme in which each color value is in the range [0, 255], other color schemes and/or values may be used analogously without departing from the scope of the disclosure herein.

Other algorithms for the operations described herein may be known in the art and may be used alternatively or in conjunction with the algorithms described herein.

The systems and algorithms disclosed herein may be implemented on numerous computing devices and mechanical systems for adapting and connecting computer systems to conveyance and food processing systems, and to cameras and image processing systems.

What is claimed is:

1. A method, comprising:
    obtaining an image from a first class;
    obtaining an augmentation object, wherein the augmentation object is segmented and comprises at least one from the following list: a real-world object, a computer-generated shape, and an object from a hair library;
    calibrating the augmentation object relative to the image from the first class to generate a calibrated augmentation object; and
    adding the calibrated augmentation object to the image from the first class to generate a spiked image of a second class;
    wherein:
        calibrating the augmentation object comprises at least one from the following list:
            adding noise to the augmentation object;
            adding blurring to the augmentation object;
            rotating the augmentation object;
            flipping the augmentation object;
            adjusting a lighting characteristic of the augmentation object to increase similarity to a lighting characteristic of the image from the first class; and
            adjusting a coloring characteristic of the augmentation object to increase similarity to a coloring characteristic of the image from the first class; and
        adding the calibrated augmentation object to the image from the first class comprises:
            selecting a background anchor point in the image from the first class;
            selecting an augmentation object anchor point in the calibrated augmentation object; and
            superimposing the augmentation object onto the image from the first class with the augmentation object anchor point at the background anchor point.

2. The method of claim 1, wherein obtaining an image from a first class comprises randomly selecting the image from the first class from a set comprising two or more images from the first class.

3. The method of claim 1, wherein obtaining an augmentation object comprises randomly selecting an augmentation object.

4. The method of claim 1, where calibrating the augmentation object comprises at least one from the following list:
    adjusting a lighting characteristic of the augmentation object to increase similarity to a lighting characteristic of the image from the first class; and
    adjusting a coloring characteristic of the augmentation object to increase similarity to a coloring characteristic of the image from the first class.

5. The method of claim 1, further comprising applying at least one operation from the following list to the augmentation object:
    randomly rotating the augmentation object;
    randomly flipping the augmentation object.

6. The method of claim 1, wherein adding the calibrated augmentation object to the image from the first class further comprises at least one from the following list:
    resizing the calibrated augmentation object;
    cropping the calibrated augmentation object;
    adjusting transparency calibrated augmentation object;
    applying edge blending to at least one of the calibrated augmentation object and the image from the first class;
    de-noising the spiked image;
    blurring the spiked-image; and
    performing blur correction on the spiked image.

7. The method of claim 1, wherein the object from the hair library is dynamically generated.

8. The method of claim 1, wherein the computer-generated shape is dynamically generated.

9. The method of claim 1, wherein the computer-generated shape comprises texture added from a texture library.

10. The method of claim 1, wherein the object from the hair library comprises at least one from the following list: a segmented image of a hair and mathematically generated hair object.

11. The method of claim 1, wherein the augmentation object comprises a real-world object.

12. The method of claim 1, wherein the augmentation object comprises a computer-generated shape.

13. The method of claim 1, wherein the augmentation object comprises an object from a hair library.

* * * * *